United States Patent
Mizuno

(10) Patent No.: US 9,983,537 B2
(45) Date of Patent: May 29, 2018

(54) DRIVE TRANSMISSION DEVICE THAT ENSURES SWITCHING TRANSMISSION STATE OF DRIVING POWER GENERATED BY SINGLE DRIVE MOTOR, AND IMAGE FORMING APPARATUS THEREWITH

(71) Applicant: Kyocera Document Solutions Inc., Osaka (JP)

(72) Inventor: Masahiko Mizuno, Osaka (JP)

(73) Assignee: Kyocera Document Solutions Inc., Osaka (JP)

( * ) Notice: Subject to any disclaimer, the term of this patent is extended or adjusted under 35 U.S.C. 154(b) by 0 days. days.

(21) Appl. No.: 15/356,546

(22) Filed: Nov. 19, 2016

(65) Prior Publication Data

US 2017/0146942 A1    May 25, 2017

(30) Foreign Application Priority Data

Nov. 19, 2015 (JP) .................................. 2015-226552

(51) Int. Cl.
| | |
|---|---|
| G03G 15/00 | (2006.01) |
| G03G 21/18 | (2006.01) |
| F16H 1/20 | (2006.01) |
| F16D 27/00 | (2006.01) |
| F16D 28/00 | (2006.01) |
| F16D 41/00 | (2006.01) |

(52) U.S. Cl.
CPC ............. *G03G 15/757* (2013.01); *F16H 1/20* (2013.01); *F16D 27/00* (2013.01); *F16D 28/00* (2013.01); *F16D 41/00* (2013.01); *G03G 15/5008* (2013.01); *G03G 21/1857* (2013.01)

(58) Field of Classification Search
CPC ............. G03G 15/757; G03G 15/5008; G03G 21/1857; F16H 1/20; F16D 27/00; F16D 28/00; F16D 41/00
See application file for complete search history.

(56) References Cited

U.S. PATENT DOCUMENTS

2012/0251184 A1* 10/2012 Hashimoto ........ G03G 15/0136
                                                         399/223
2015/0220018 A1*  8/2015 Nanno ............... G03G 15/0178
                                                         399/167

FOREIGN PATENT DOCUMENTS

| JP | 2000-214685 A | 8/2000 |
|---|---|---|
| JP | 2005-076734 A | 3/2005 |

(Continued)

*Primary Examiner* — Joseph S Wong
(74) *Attorney, Agent, or Firm* — James W. Judge

(57) ABSTRACT

A drive transmission device includes a driving power receiver, a first rotator drive transmission system, and a second rotator drive transmission system. The driving power receiver directly receives the driving power from an output shaft of the drive motor. The first rotator drive transmission system is configured to transmit the driving power from the driving power receiver to the respective first rotators of the first structure and the second structure. The second rotator drive transmission system is configured to switch a state of transmission of the driving power from the driving power receiver into a first transmission state in which the driving power is transmitted to the respective second rotators of the first structure and the second structure, and into a second transmission state in which the driving power is transmitted to the second rotator of the first structure alone.

7 Claims, 17 Drawing Sheets

(56) References Cited

FOREIGN PATENT DOCUMENTS

| JP | 2006-214567 A | 8/2006 |
|---|---|---|
| JP | 2008-095870 A | 4/2008 |

\* cited by examiner

DRIVE TRANSMISSION DEVICE THAT ENSURES SWITCHING TRANSMISSION STATE OF DRIVING POWER GENERATED BY SINGLE DRIVE MOTOR, AND IMAGE FORMING APPARATUS THEREWITH

INCORPORATION BY REFERENCE

This application is based upon, and claims the benefit of priority from, corresponding Japanese Patent Application No. 2015-226552 filed in the Japan Patent Office on Nov. 19, 2015, the entire contents of which are incorporated herein by reference.

BACKGROUND

Unless otherwise indicated herein, the description in this section is not prior art to the claims in this application and is not admitted to be prior art by inclusion in this section.

A typical image forming apparatus such as a full-color laser printer and a copier includes such as image forming units of four colors, cyan (C), magenta (M), yellow (Y) and black (Bk), and the image forming unit includes a photoreceptor drum and a developing device. Since each of the image forming units includes rotators such as a developing roller arranged in the photoreceptor drum and the developing device, the image forming apparatus includes a drive motor for driving the rotators and a drive transmission device that transmits driving power generated by the drive motor to the rotators.

SUMMARY

A drive transmission device according to one aspect of the disclosure transmits driving power to first rotators and second rotators of a first structure and a second structure. The driving power is generated by a driving motor. The first structure and the second structure each include a combination of first and second rotators. The drive transmission device includes a driving power receiver, a first rotator drive transmission system, and a second rotator drive transmission system. The driving power receiver directly receives the driving power from an output shaft of the drive motor. The first rotator drive transmission system is configured to transmit the driving power from the driving power receiver to the respective first rotators of the first structure and the second structure. The second rotator drive transmission system is configured to switch a state of transmission of the driving power from the driving power receiver into a first transmission state in which the driving power is transmitted to the respective second rotators of the first structure and the second structure, and into a second transmission state in which the driving power is transmitted to the second rotator of the first structure alone.

These as well as other aspects, advantages, and alternatives will become apparent to those of ordinary skill in the art by reading the following detailed description with reference where appropriate to the accompanying drawings. Further, it should be understood that the description provided in this summary section and elsewhere in this document is intended to illustrate the claimed subject matter by way of example and not by way of limitation.

BRIEF DESCRIPTION OF THE DRAWINGS

FIG. 10A illustrates a state where a cover is attached, and FIG. 10B illustrates a state where the cover is removed.

FIG. 11A illustrates from an inner side and FIG. 11B illustrates from an outer side.

FIG. 13A illustrates a relation between the cam lever and a cam, and FIGS. 13B and 13C illustrates a relation between the cam lever and a link member.

FIG. 15A illustrates the developing transmission system in a plan view, and FIG. 15B illustrates a cross section of the developing drive transmission relay gear.

FIG. 16A illustrates the developing transmission system in a plan view, and FIG. 16B illustrates a cross section of the developing drive transmission relay gear.

DETAILED DESCRIPTION

Figure 1:
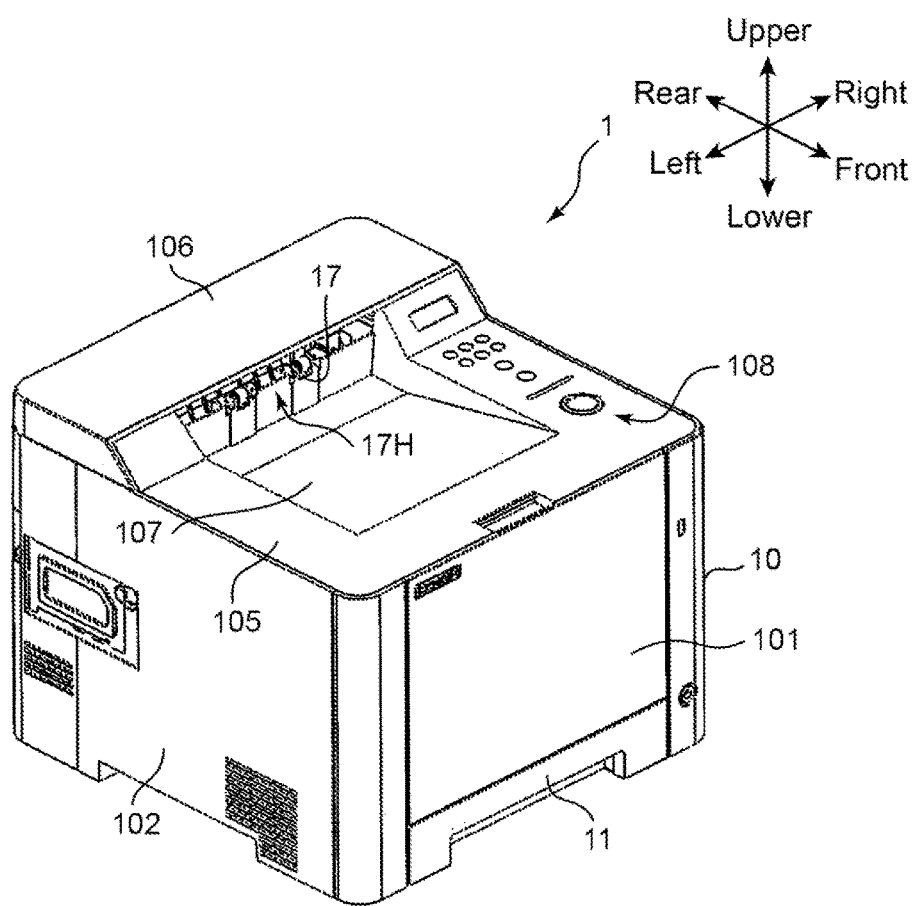
FIG. 1 obliquely illustrates an image forming apparatus according to one embodiment of the disclosure.

Example apparatuses are described herein. Other example embodiments or features may further be utilized, and other changes may be made, without departing from the spirit or scope of the subject matter presented herein. In the following detailed description, reference is made to the accompanying drawings, which form a part thereof.

The example embodiments described herein are not meant to be limiting. It will be readily understood that the aspects of the present disclosure, as generally described herein, and illustrated in the drawings, can be arranged, substituted, combined, separated, and designed in a wide variety of different configurations, all of which are explicitly contemplated herein.

Figure 2:
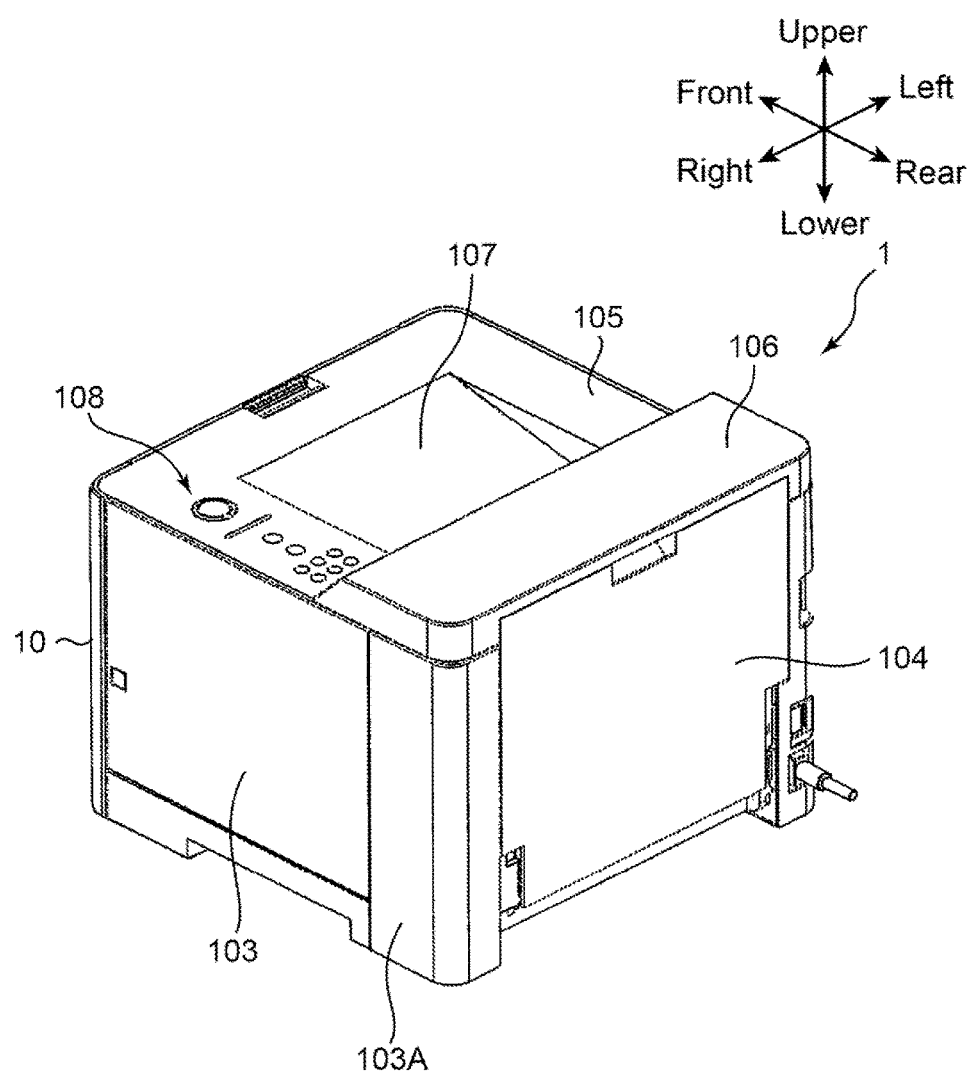
FIG. 2 obliquely illustrates the image forming apparatus according to the one embodiment from a different perspective direction.

The following describes a drive transmission device and an image forming apparatus according to one embodiment of the disclosure based on the drawings. FIGS. 1 and 2 obliquely illustrate an image forming apparatus 1 according to the one embodiment of the disclosure. While the image forming apparatus 1 is a full color printer, the image forming apparatus 1 may be such as a full-color copier, a facsimile device, and a multi-functional peripheral that has these functions in other embodiments.

Terms representing directions such as "upper" and "lower," "front" and "rear," and "left" and "right" used in the following description are simply aimed to make explanations clear, and do not limit the principle of the image forming apparatus 1. In the following description, a term of "sheet" includes a copy paper, a coated paper, an OHP sheet, a cardboard, a postcard, a tracing paper and other sheet members on which an image formation process is performed, or sheet members to which any process other than the image formation process is performed.

The image forming apparatus 1 includes a main body housing 10 that is a box shaped apparatus main body for housing various devices to form images on the sheet. The main body housing 10 includes side surfaces of front, rear, left and right respectively covered with a front side plate 101, a rear side plate 104, a left side plate 102, and a right side plate 103, and the side plates also serve as an exterior. The main body housing 10 includes a right rear corner portion covered with a corner side plate 103A. The main body housing 10 includes a top surface covered with a top panel 105. The top panel 105 includes a bulge portion 106 with a sheet discharge exit 17H on the rear side, and includes a sheet discharge tray 107 that receives the sheets discharged from the sheet discharge exit 17H on the front side. The top panel 105 includes an operation unit 108 that accepts operation information to the image forming apparatus 1 from a user near the right edge. The main body housing 10 removably includes a sheet feed cassette 11 on the bottom portion.

Figure 3:
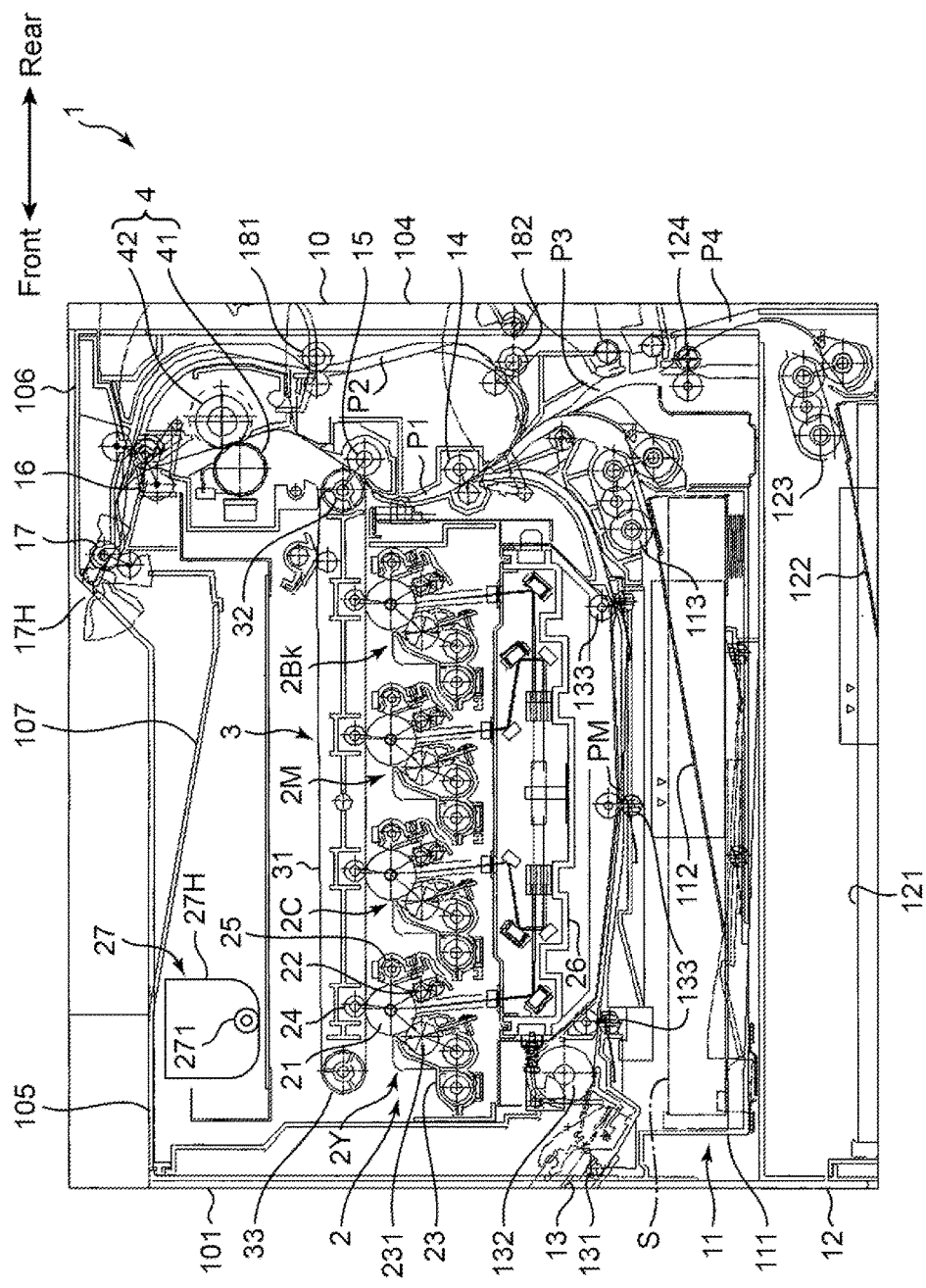
FIG. 3 illustrates a cross section of an internal structure of the image forming apparatus according to the one embodiment.

FIG. 3 obliquely illustrates an internal constitution of the image forming apparatus 1. FIG. 3 illustrates a state where a paper feeder 12 is added below the sheet feed cassette 11. The image forming apparatus 1 includes a paper sheet feeder, an imaging unit 2 (imaging system), an intermediate transfer unit 3, a fixing unit 4, and a sheet conveyance system. The paper sheet feeder includes the sheet feed cassette 11, the paper feeder 12, and a bypass tray 13. The imaging unit 2 forms toner image (developer image). The sheet conveyance system includes the above-described paper sheet feeder and sheet discharge tray 107, and conveys the sheet in the main body housing 10.

The sheet feed cassette 11 houses a bundle of sheets S to which the toner image is transferred. The sheet feed cassette 11 includes a sheet housing portion 111 that houses the bundle of the sheets S, a lift plate 112 where the bundle of the sheets S is placed, and a feed roller 113 that feeds the uppermost sheet of the bundle of the sheets S to a main conveyance path P1. The paper feeder 12 is an option paper feeding unit installed on the bottom portion of the main body housing 10 and similarly includes a sheet housing portion 121, a lift plate 122, and a feed roller 123. The paper feeder 12 includes a communicating conveyance path P4 where the sheet fed by the feed roller 123 passes through, and the communicating conveyance path P4 includes a feeding roller 124 on the downstream end. The bypass tray 13 is a tray where manual feed sheets are placed. Near the bypass tray 13, a nip roller 131 that draws in the manual feed sheets and a manual paper feed roller 132 that feeds the manual feed sheets to a manual paper feed conveyance path PM are arranged. A plurality of conveyance rollers 133 are arranged along the manual paper feed conveyance path PM.

The imaging unit 2 includes four image forming units that images the toner image of respective colors of black (Bk), yellow (Y), cyan (C) and magenta (M). That is, the imaging unit 2 includes a first image forming unit 2Bk (first structure) that images black toner image and a second image forming unit 2Y (second structure) that images a yellow toner image, further, a third image forming unit 2C that images cyan toner image and a fourth image forming unit 2M that images magenta toner image.

Each of the first image forming unit 2Bk, the second image forming unit 2Y, the third image forming unit 2C and the fourth image forming unit 2M includes a photoreceptor drum 21 (image carrier), a charging apparatus 22, a developing device 23, a primary transfer roller 24, and a cleaning apparatus 25. That is, the imaging unit 2 includes four colors of combinations of the photoreceptor drum 21 and the developing device 23. Further, the imaging unit 2 includes a light scanning device 26 shared among the image forming units of four colors.

In the following description, the photoreceptor drum 21 and the developing device 23 (developing roller 231) included in each of the first image forming unit 2Bk, the second image forming unit 2Y, the third image forming unit 2C and the fourth image forming unit 2M are specifically described as follows. The photoreceptor drum and the developing roller as rotators included in the first image forming unit 2Bk are respectively referred to as a "first photoreceptor drum 21Bk (first rotator)," and "a first developing roller 231Bk (second rotator)." The photoreceptor drum and the developing roller as rotators included in the second image forming unit 2Y are respectively referred to as "a second photoreceptor drum 21Y (first rotator)," and "a second developing roller 231Y (second rotator)." The photoreceptor drum and the developing roller as rotators included in the third image forming unit 2C are respectively referred to as "a third photoreceptor drum 21C (first rotator)," and "a third developing roller 231C (second rotator)." The photoreceptor drum and the developing roller as rotators included in the fourth image forming unit 2M are respectively referred to as "a fourth photoreceptor drum 21M (first rotator)," and "a fourth developing roller 231M (second rotator)."

The photoreceptor drum 21 is a cylindrically-shaped member that carries electrostatic latent image and toner image (developer image) on top of the circumference surface. The photoreceptor drum 21 includes a drum rotation shaft extending in a lateral direction, and is rotatably driven around the drum rotation shaft. The charging apparatus 22 approximately evenly charges the circumference surface of the photoreceptor drum 21. The light scanning device 26 includes a light source that emits laser beam for scanning, a polygon mirror for deflection, and an imaging optical system. The light scanning device 26 irradiates the laser beam corresponding to image data on the approximately evenly charged circumference surface of the photoreceptor drum 21 to form the electrostatic latent image.

The developing device 23 develops the electrostatic latent image to expose, and includes the developing roller 231 that supplies a toner (developer) on the circumference surface of the photoreceptor drum 21 where the electrostatic latent image is formed. The developing roller 231 includes a roller rotation shaft extending in the lateral direction, and is rotatably driven around the roller rotation shaft. Supplying the toner from the developing device 23 forms a toner image on the circumference surface of the photoreceptor drum 21.

The primary transfer roller 24 is arranged facing to the photoreceptor drum 21 from above, and forms a transfer nip portion with the photoreceptor drum 21 across an intermediate transfer belt 31 described later. The primary transfer roller 24 is provided a transfer bias for transferring the toner image carried by the photoreceptor drum 21 on the intermediate transfer belt 31. The cleaning apparatus 25 removes the toner left on the circumference surface of the photoreceptor drum 21 after the toner image is transferred on the sheet S.

Furthermore, the image forming apparatus 1 includes a toner container 27 that replenishes the toner to the developing device 23. FIG. 3 illustrates only the toner container 27 for the second image forming unit 2Y and omits the toner containers 27 for the other colors. The toner container 27 includes a container main body 27H that stores the toner of respective colors and a container feeder 271 that is internally arranged on the container main body 27H and feeds the stored toner to a toner discharge port (not illustrated). The container feeder 271 includes a rotation shaft extending in the lateral direction and a spiral piece located on the circumference of the rotation shaft, and is rotatably driven around the rotation shaft.

The intermediate transfer unit 3 is arranged above the imaging unit 2, and includes the intermediate transfer belt 31, where the toner image carried on the circumference surface of the photoreceptor drum 21 is primarily transferred, a belt drive roller 32 that circularly drives the intermediate transfer belt 31, and a tension roller 33. The intermediate transfer belt 31 is an endless belt, and includes an outer peripheral surface where the toner image is primarily transferred. The intermediate transfer belt 31 is tightly stretched between the belt drive roller 32 and the tension roller 33, and circularly travels when the belt drive roller 32 is rotatably driven. A secondary transfer roller 15 is brought into pressure contact with the belt drive roller 32 via the intermediate transfer belt 31 to form a secondary transfer unit.

The fixing unit 4 includes a fixing roller 41, which includes a heat source, and a pressure roller 42, which forms the fixing nip portion with the fixing roller 41. Each of the fixing roller 41 and the pressure roller 42 includes a rotation shaft extending in the lateral direction, and is rotatably driven around the rotation shaft. The fixing unit 4 conveys the sheet where the toner image is transferred in the secondary transfer unit while heating and applying pressure to the sheet in the fixing nip portion to perform a fixing process that welds the toner on the sheet.

The image forming apparatus 1 includes the sheet conveyance system that includes the paper sheet feeder, the sheet discharge tray 107, various sheet conveyance paths, and sheet conveyance rollers. The paper sheet feeder includes the above-described sheet feed cassette 11, the paper feeder 12, and the bypass tray 13, and feeds the sheet where the toner image is secondarily transferred. The sheet discharge tray 107 receives the sheet after the secondary transfer. The sheet conveyance rollers are arranged on the sheet conveyance paths.

The sheet conveyance path includes a main conveyance path P1, an inverting conveyance path P2, communicating conveyance paths P3 and P4, and the above-described manual paper feed conveyance path PM. The main conveyance path P1 is a conveyance path that extends mostly in a vertical direction, and leads the sheet from the paper sheet feeder to the sheet discharge tray 107 via the intermediate transfer unit 3 (secondary transfer unit) and the fixing unit 4 (fixing nip portion). The inverting conveyance path P2 is a conveyance path that inversely conveys the sheet from near the downstream end to near the upstream end of the main conveyance path P1 when a duplex printing is performed on the sheet. The communicating conveyance path P3 of the main body housing 10 side and the communicating conveyance path P4 of the paper feeder 12 side are conveyance paths that communicate to one another when the paper feeder 12 is installed on the main body housing 10. The downstream end of the communicating conveyance path P3 and the downstream end of the manual paper feed conveyance path PM are connected to near the upstream end of the main conveyance path P1.

In this embodiment, in addition to the above-described feed rollers 113, 123, and 132, the feeding roller 124 and the conveyance roller 133, the sheet conveyance roller includes a registration roller 14, the secondary transfer roller 15, and a conveyance roller 16 and a discharging roller 17 as fixing exits, which are arranged on the main conveyance path P1, and inverting conveyance rollers 181 and 182, which are arranged on the inverting conveyance path P2.

The registration roller 14 is arranged on the upstream side with respect to the secondary transfer unit on the main conveyance path P1. The registration roller 14 causes the sheet to temporarily wait, and subsequently supplies the sheet to the secondary transfer unit at a predetermined timing. The secondary transfer roller 15 is located facing the belt drive roller 32 via the intermediate transfer belt 31 to form the secondary transfer unit. The sheet passing through the secondary transfer unit is fed to the downstream side while being in contact with the secondary transfer roller 15 and the intermediate transfer belt 31.

The conveyance roller 16 is a roller that conveys the sheet, which has passed through the fixing unit 4, to the sheet discharge exit 17H. The discharging roller 17 is a roller that discharges the sheet, where the secondary transfer and the fixing process have been performed, from the main conveyance path P1 to the sheet discharge tray 107 passing through the sheet discharge exit 17H. The inverting conveyance rollers 181 and 182 are rollers that inversely convey the sheet on the inverting conveyance path P2. A pair of the fixing roller 41 and the pressure roller 42 also serves to convey the sheet on the main conveyance path P1.

Figure 4:
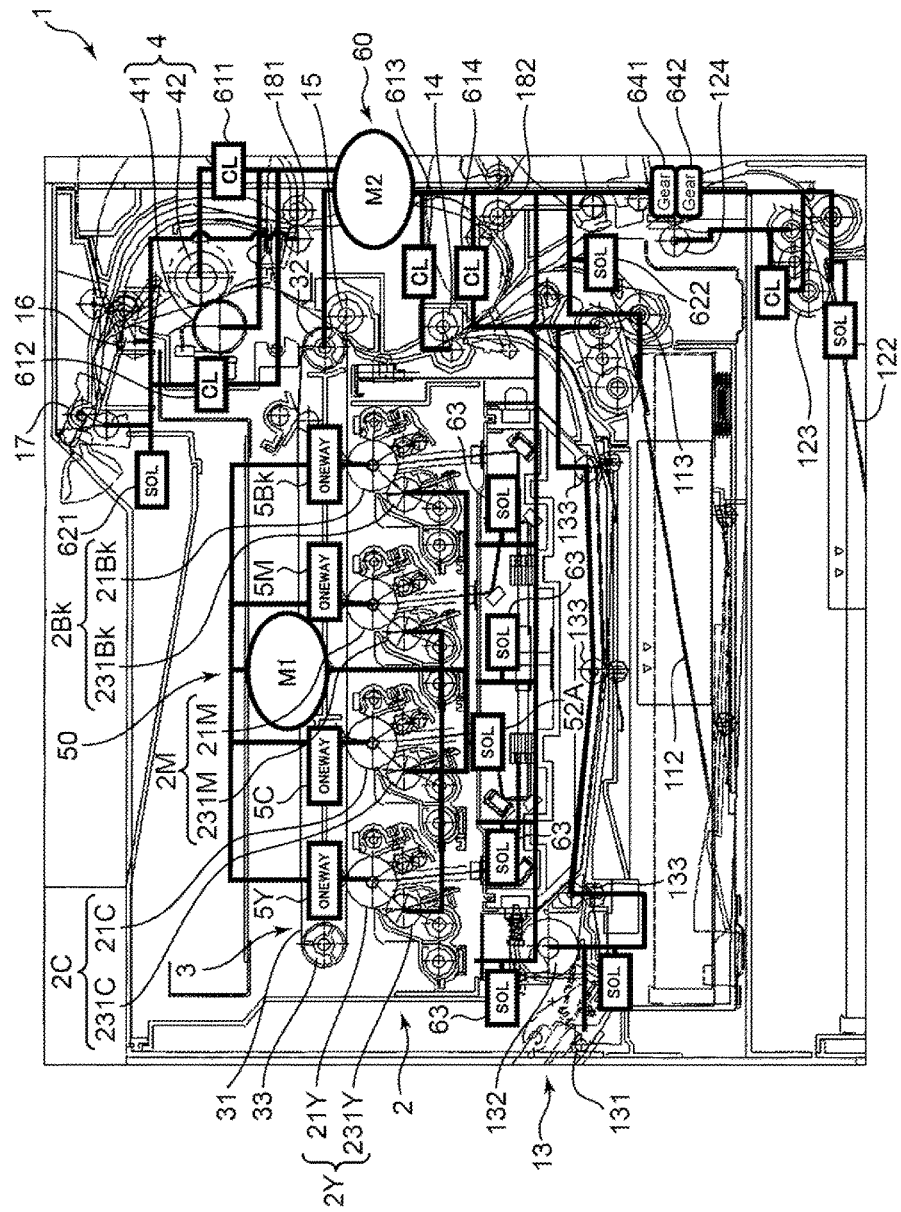
FIG. 4 schematically illustrates a drive transmission system indicated on the cross section of the internal structure of the image forming apparatus according to the one embodiment.

FIG. 4 schematically illustrates a driving source and a drive transmission system indicated on the cross section of the image forming apparatus 1 illustrated in FIG. 3. FIG. 4 omits to illustrate the toner container 27. As described above, the image forming apparatus 1 includes many rotators that require to be rotatably driven such as the photoreceptor drum 21 and the developing roller 231 included in the imaging unit 2, the belt drive roller 32 included in the intermediate transfer unit 3, the fixing roller 41 and the pressure roller 42 of the fixing unit 4, and a group of conveyance rollers included in the sheet conveyance system. The image forming apparatus 1 of this embodiment includes only two drive motors, that is, only a first drive motor M1 and a second drive motor M2 as the driving source to drive the rotators.

The first drive motor M1 generates a first driving power to be transferred to predetermined units by a first drive transmission system 50. The second drive motor M2 generates a second driving power to be transferred to predetermined units by a second drive transmission system 60. Each of the first drive transmission system 50 and the second drive transmission system 60 includes a plurality of gear members and various clutch members that are integratedly attached on a dedicated box with the respective drive motors M1 and M2.

Figure 5:
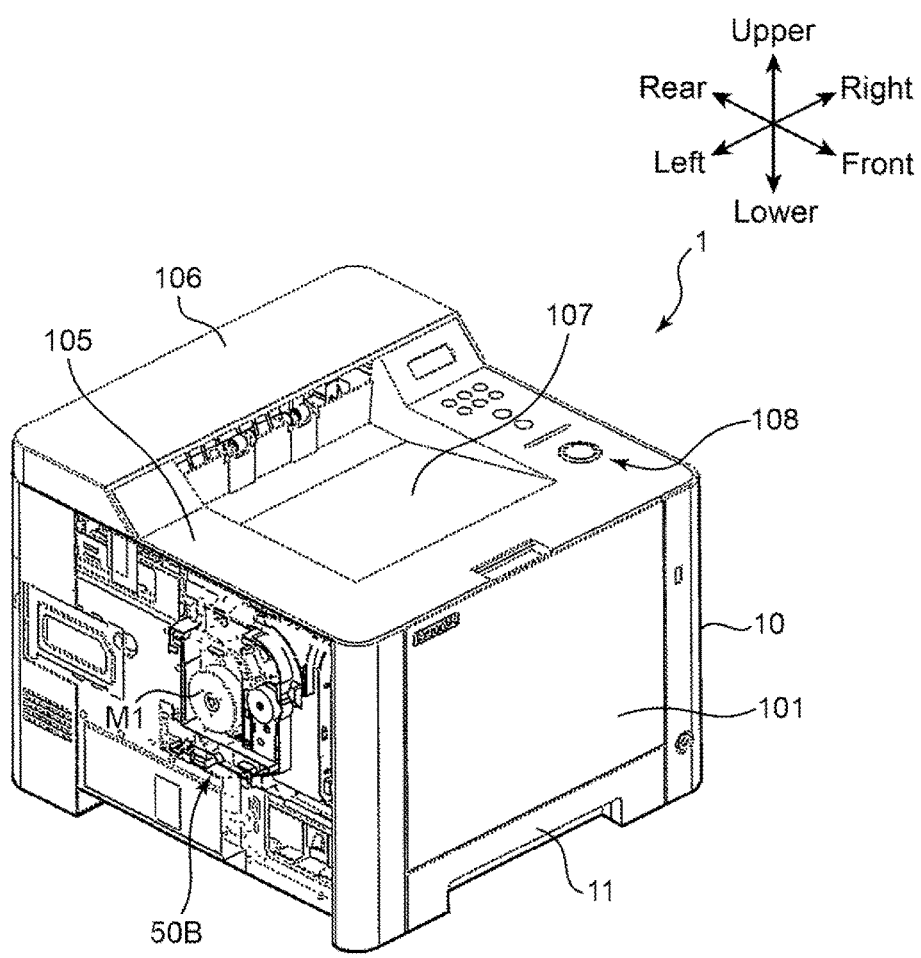
FIG. 5 obliquely illustrates the image forming apparatus according to the one embodiment in a state where a left side plate is removed.

FIG. 5 illustrates an installation state of a first driving box 50B, which holds the first drive motor M1 and the first drive transmission system 50, to the main body housing 10. FIG. 5 obliquely illustrates a state where a left side plate 102 is removed from the perspective view in FIG. 1.

The first driving box 50B is installed on a left side surface side of the main body housing 10. On the other hand, a second driving box (not illustrated), which holds the second drive motor M2 and the second drive transmission system 60, is installed on a right-side surface side of the main body housing 10. Thus, arranging the first driving box 50B and the second driving box on the respective side surfaces facing one another reduces an influence of vibrations caused by one to the other. Especially, the influence of the vibration by the second drive motor M2 and the second drive transmission system 60 to the first drive transmission system 50 that affects an image quality can be reduced.

Figure 6:
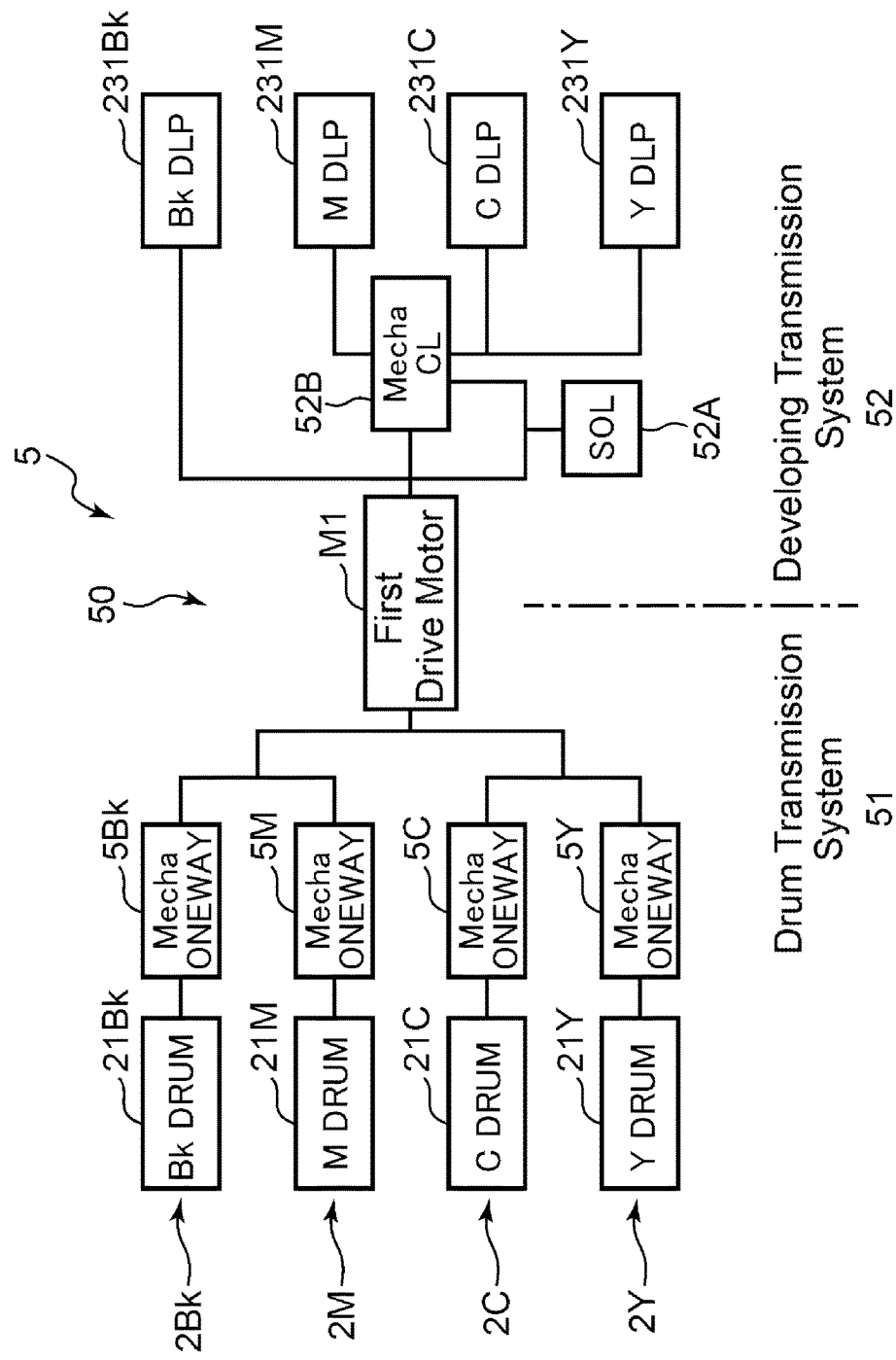
FIG. 6 illustrates a configuration of a first drive transmission system in the drive transmission device according to the one embodiment of the disclosure.
Figure 7:
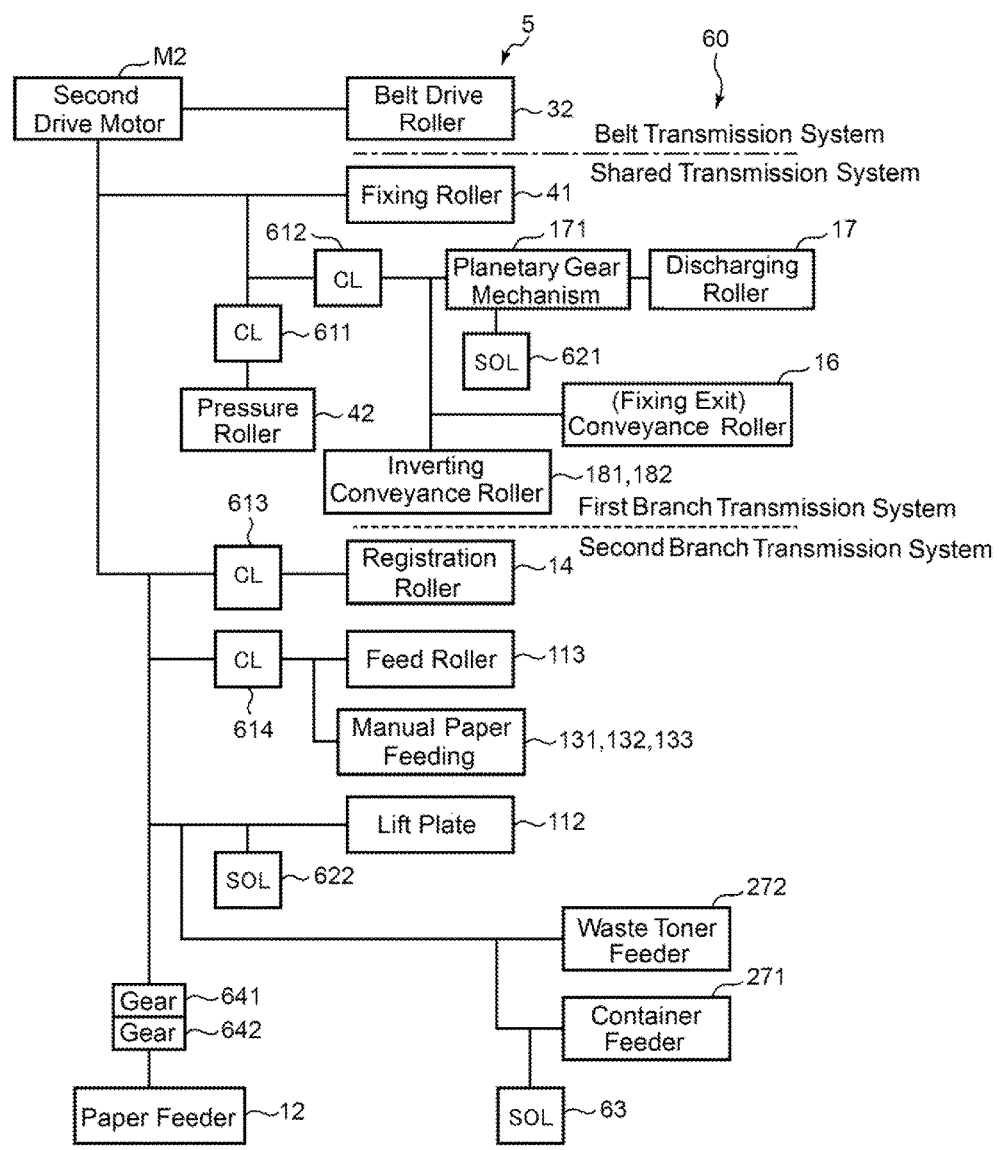
FIG. 7 illustrates a configuration of a second drive transmission system in the drive transmission device according to the one embodiment of the disclosure.

Next, a description will be given of the drive transmission device configured to include the first drive transmission system 50 and the second drive transmission system 60 with reference to FIGS. 4, 6 and 7. FIG. 6 illustrates a configuration of the first drive transmission system 50 in a drive transmission device 5 according to the embodiment. FIG. 7 illustrates a configuration of the second drive transmission system 60 in the drive transmission device 5. In FIGS. 6 and 7, "ONEWAY" indicates a one-way clutch, and "CL" indicates an electromagnetic clutch. "SOL" indicates a solenoid actuator for switching a state of a part of driving parts in connecting to or separated from the drive transmission system.

The first drive transmission system 50 transmits the first driving power generated by the first drive motor M1 only to the photoreceptor drum 21 and the developing roller 231 of the developing device 23. Specifically, the first drive transmission system 50 is constituted of two transmission systems to which the first driving power is directly transmitted from the first drive motor M1, that is, a drum transmission system 51 (first rotator drive transmission system) as a drive transmission system to the photoreceptor drum 21 and a developing transmission system 52 (second rotator drive transmission system) as a drive transmission system to the developing roller 231. The first drive transmission system 50 includes one-way clutches 5Bk, 5Y, 5C, and 5M, a solenoid actuator 52A, a mechanical clutch 52B, and many transmission gears.

The drum transmission system 51 transmits the first driving power via each of the one-way clutch 5Bk, which is attached on the drum rotation shaft of the first photoreceptor drum 21Bk of the first image forming unit 2Bk, the one-way clutch 5Y, which is attached on the drum rotation shaft of the second photoreceptor drum 21Y of the second image forming unit 2Y, the one-way clutch 5C, which is attached on the drum rotation shaft of the third photoreceptor drum 21C of the third image forming unit 2C, and the one-way clutch 5M, which is attached on the drum rotation shaft of the fourth photoreceptor drum 21M of the fourth image forming unit 2M. The first photoreceptor drum 21Bk, the second photoreceptor drum 21Y, the third photoreceptor drum 21C and the fourth photoreceptor drum 21M are rotary driven bodies arranged parallel to one another. When the first drive motor M1 is driven, that is, when the image formation is performed, all the photoreceptor drums are rotatably driven regardless of whether the image to be formed is a monochrome image or a color image. The drum transmission system 51 will be described later in detail.

The developing transmission system 52 transmits the first driving power to each of the roller rotation shaft of the first developing roller 231Bk (second rotator) of the first image forming unit 2Bk, the roller rotation shaft of the second developing roller 231Y (second rotator) of the second image forming unit 2Y, the roller rotation shaft of the third developing roller 231C (second rotator) of the third image forming unit 2C, and the roller rotation shaft of the fourth developing roller 231M (second rotator) of the fourth image forming unit 2M.

The mechanical clutch 52B is a clutch configured to switch the transmission state of the first driving power from the first drive motor M1 when the solenoid actuator 52A performs a mechanical lock and releases the lock. When the image to be formed is a color image, the mechanical clutch 52B sets the transmission state of the first driving power from the first drive motor M1 in a first transmission state where the first driving power is transmitted to every developing roller of four colors of the first developing roller 231Bk, the second developing roller 231Y, the third developing roller 231C and the fourth developing roller 231M. On the other hand, when the image to be formed is a monochrome image, the mechanical clutch 52B sets the transmission state of the first driving power from the first drive motor M1 in a second transmission state where the first driving power is transmitted to only the first developing roller 231Bk as the developing roller of black. The developing transmission system 52 will be described later in detail.

The second drive transmission system 60 transmits the second driving power generated by the second drive motor M2 to rotators other than the photoreceptor drum 21 and the developing device 23 that are housed in the main body housing 10 and requires to be driven. Specifically, the second drive transmission system 60 transmits the second driving power to the intermediate transfer unit 3, the fixing unit 4, the toner container 27, and the sheet conveyance system including the paper feeder 12. The second drive transmission system 60 includes electromagnetic clutches 611, 612, 613, and 614, solenoid actuators 621, 622, and 63, connecting gears 641 and 642, and many transmission gears.

The second drive transmission system 60 includes two transmission systems to which the second driving power is directly transmitted from a second motor output shaft of the second drive motor M2, that is, a belt transmission system as a drive transmission system to the belt drive roller 32 of the intermediate transfer unit 3 and a shared transmission system as a drive transmission system to the other units. The shared transmission system includes a first branch transmission system and a second branch transmission system. The first branch transmission system transmits the second driving power to the fixing roller 41, the pressure roller 42, the discharging roller 17, the conveyance roller 16 and the inverting conveyance rollers 181 and 182. The second branch transmission system transmits the second driving power to the registration roller 14, the feed roller 113, the rollers 131, 132, and 133 of a manual paper feeding system, the container feeder 271 and the waste toner feeder 272 that convey the toner and the waste toner, and the paper feeder 12.

The belt drive roller 32 of the belt transmission system is directly transmitted the second driving power from the second drive motor M2. The belt drive roller 32 circularly drives the intermediate transfer belt 31. Therefore, controlling the rotation speed of the second drive motor M2 ensures a configuration where an accurate control of the circulating speed of the intermediate transfer belt 31 is easily performed. While the photoreceptor drum 21 is driven by the first drive motor M1, the intermediate transfer belt 31 is driven by the second drive motor M2. Then, the speed control of both of the photoreceptor drum 21 and the intermediate transfer belt 31 can be separately performed. These contribute to a satisfactory image forming.

A transmission system to the fixing roller 41 of the first branch transmission system does not specifically include such as a clutch, and the fixing roller 41 is transmitted the second driving power every time when the second drive motor M2 is driven. In a state where the pressure roller 42 is pressed to the fixing roller 41, the fixing roller 41 drives the rotation of the pressure roller 42. On the other hand, the pressure roller 42 includes the electromagnetic clutch 611 that separates the pressure roller 42 from the fixing roller 41. The electromagnetic clutch 611 causes a cam member in contact with a holding member that rotatably holds the pressure roller 42 to operate to separate the pressure roller 42 from the fixing roller 41. The second driving power is transmitted to the conveyance roller 16, the discharging roller 17, and the inverting conveyance rollers 181 and 182 via the electromagnetic clutch 612. The electromagnetic clutches 611 and 612 connect the respective rollers to the shared transmission system at a predetermined sheet conveying timing to provide the driving power for sheet conveyance to the rollers.

The drive transmission system to the discharging roller 17 includes a planetary gear mechanism 171 with a sun gear and a planetary gear. The solenoid actuator 621 turns the planetary gear around the sun gear to switch the output side of the planetary gear mechanism 171. This switches the rotation direction of the discharging roller 17. The discharging roller 17 is driven in the normal rotation when the sheet is discharged to the sheet discharge tray 107, and inversely driven when the sheet is conveyed to the inverting conveyance path P2 for the duplex printing.

The transmission system to the registration roller 14 in the second branch transmission system includes the electromagnetic clutch 613. The registration roller 14 repeats driving rotation and temporary stopping for a skew correction of the sheet and feeding of the sheet to the secondary transfer unit at a predetermined timing. The driving control is achieved by an operation control to the electromagnetic clutch 613.

The transmission system to the feed roller 113 and the transmission system to the nip roller 131 of the manual paper feeding system, the manual paper feed roller 132, and three conveyance rollers 133 include the electromagnetic clutch 614. The electromagnetic clutch 614 connects the rollers 113, 131, 132, and 133 to the shared transmission system at a predetermined timing where the sheets are fed from the sheet feed cassette 11 or the bypass tray 13 to provide the driving power for the sheet feeding to the rollers. To the second branch transmission system, an up and down driving mechanism of the lift plate 112 of the sheet feed cassette 11 is also connected. The up and down driving mechanism is configured to be connected to or separated from the shared transmission system by the solenoid actuator 622.

The respective transmission systems to the container feeder 271 of the toner container 27 of the respective colors include a solenoid actuator 63. The respective solenoid actuators 63 connects the container feeder 271 to the shared transmission system at such as a timing where the developing device 23 of the respective colors requires the toner replenishment, and separates the container feeder 271 from the shared transmission system at the other timing. The waste toner feeder 272 is a feeder internally arranged on a waste toner conveyance path (not illustrated) to convey the waste toner to a waste toner container (not illustrated). The waste toner feeder 272 is always connected to the shared transmission system.

On the transmission system to the paper feeder 12 of the second branch transmission system, the connecting gear 641 in the main body housing 10 side and the connecting gear 642 in the paper feeder 12 side are interposed. Both connecting gears 641 and 642 are meshed with one another when the paper feeder 12 is installed on the main body housing 10. This ensures transmitting the second driving power to the lift plate 122 included in the paper feeder 12 and the feed roller 113.

Next, a description will be given of the configuration of the first drive transmission system 50 constituted of the drum transmission system 51 and the developing transmission system 52 in the drive transmission device 5 in detail with reference to FIG. 8 to FIGS. 16A and 16B.

Figure 8:
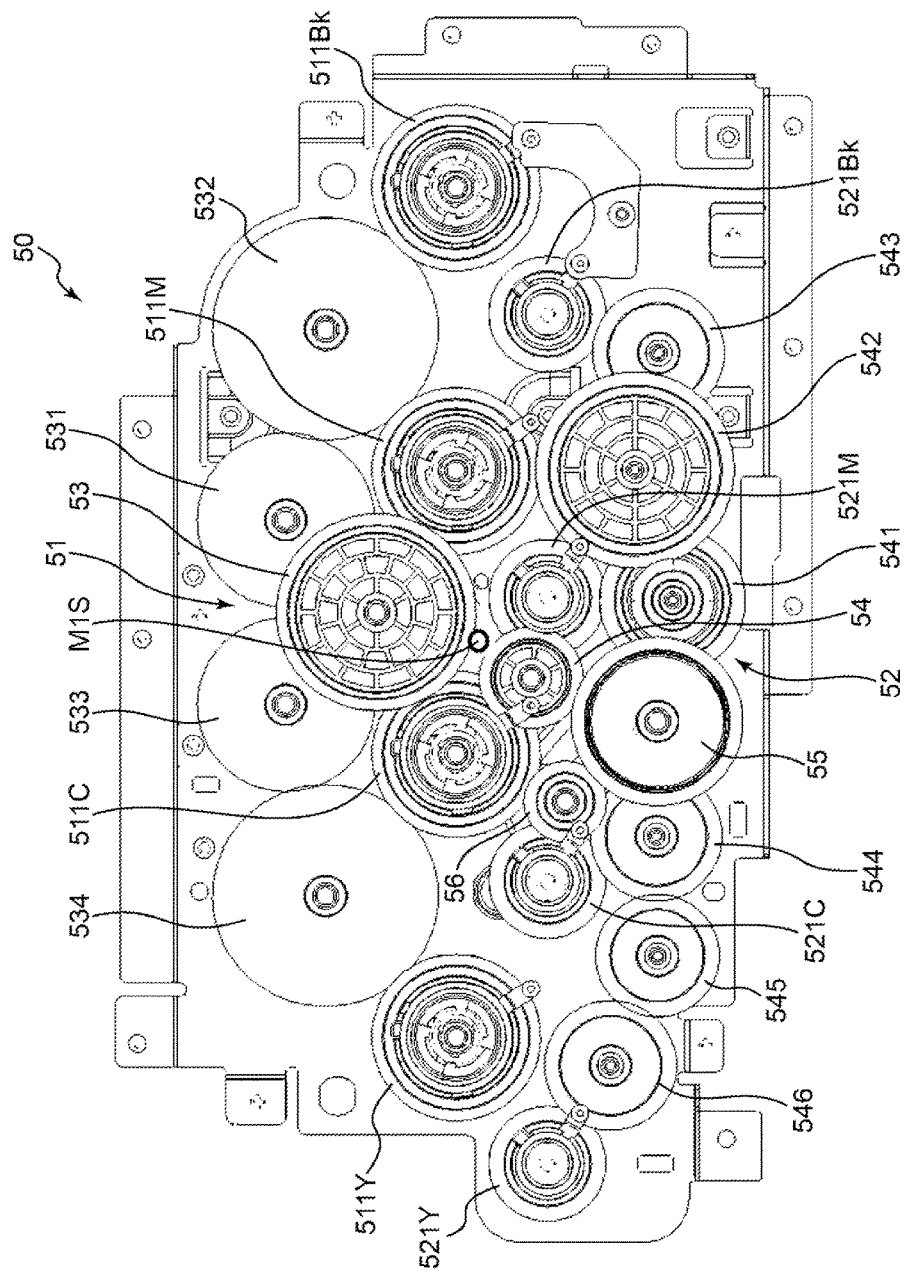
FIG. 8 illustrates a gear train that constitutes a drive transmission route in the first drive transmission system of the drive transmission device according to the one embodiment in a plan view.

FIG. 8 illustrates a gear train that forms the drive transmission route in the first drive transmission system 50 of the drive transmission device 5 in a plan view. A surface illustrated in FIG. 8 is a surface facing inside the main body housing 10.

The first drive transmission system 50 of the drive transmission device 5 includes a drum driving power receiver gear 53 (first gear) and a development driving power receiver gear 54 (second gear), the drum transmission system 51, and the developing transmission system 52.

The drum driving power receiver gear 53 and the development driving power receiver gear 54 are directly meshed with a first motor output shaft M1S of the first drive motor M1. The drum driving power receiver gear 53 and the development driving power receiver gear 54 constitute a driving power receiver that directly receives the first driving power from the first motor output shaft M1S.

The drum transmission system 51 transmits the first driving power from the drum driving power receiver gear 53 to each of the first photoreceptor drum 21Bk, the second photoreceptor drum 21Y, the third photoreceptor drum 21C, and the fourth photoreceptor drum 21M. The drum transmission system 51 includes a first drum driving transmission gear 531, a second drum driving transmission gear 532, a third drum driving transmission gear 533, and a fourth drum driving transmission gear 534, and a first drum gear 511Bk, a second drum gear 511Y, a third drum gear 511C, and a fourth drum gear 511M.

The first drum driving transmission gear 531 is meshed with the drum driving power receiver gear 53, and the first drum driving transmission gear 531 is meshed with the second drum driving transmission gear 532. The second drum driving transmission gear 532 is meshed with the first drum gear 511Bk arranged coaxially with the drum rotation shaft of the first photoreceptor drum 21Bk. The first drum driving transmission gear 531, the second drum driving transmission gear 532, and the first drum gear 511Bk constitute a drive transmission route (hereinafter referred to as "first drum drive transmission route") that transmits the first driving power from the drum driving power receiver gear 53 to the first photoreceptor drum 21Bk.

The third drum driving transmission gear 533 is meshed with the drum driving power receiver gear 53, and the third drum driving transmission gear 533 is meshed with the fourth drum driving transmission gear 534. The fourth drum driving transmission gear 534 is meshed with the second drum gear 511Y arranged coaxially with the drum rotation shaft of the second photoreceptor drum 21Y. The third drum driving transmission gear 533, the fourth drum driving transmission gear 534, and the second drum gear 511Y constitute a drive transmission route (hereinafter referred to as "second drum drive transmission route") that transmits the first driving power from the drum driving power receiver gear 53 to the second photoreceptor drum 21Y.

The fourth drum driving transmission gear 534 is meshed with the third drum gear 511C arranged coaxially with the drum rotation shaft of the third photoreceptor drum 21C. The third drum driving transmission gear 533, the fourth drum driving transmission gear 534, and the third drum gear 511C constitute a drive transmission route (hereinafter referred to as "third drum drive transmission route") that transmits the first driving power from the drum driving power receiver gear 53 to the third photoreceptor drum 21C.

The second drum driving transmission gear 532 is meshed with the fourth drum gear 511M arranged coaxially with the drum rotation shaft of the fourth photoreceptor drum 21M. The first drum driving transmission gear 531, the second drum driving transmission gear 532, and the fourth drum gear 511M constitute a drive transmission route (hereinafter referred to as "fourth drum drive transmission route") that transmits the first driving power from the drum driving power receiver gear 53 to the fourth photoreceptor drum 21M.

The drum transmission system 51 configured as described above transmits the first driving power from the drum driving power receiver gear 53 to each of the first photoreceptor drum 21Bk, the second photoreceptor drum 21Y, the third photoreceptor drum 21C, and the fourth photoreceptor drum 21M respectively via the first drum drive transmission route, the second drum drive transmission route, the third drum drive transmission route, and the fourth drum drive transmission route regardless of whether the image to be formed is a monochrome image or a color image.

Figure 9:
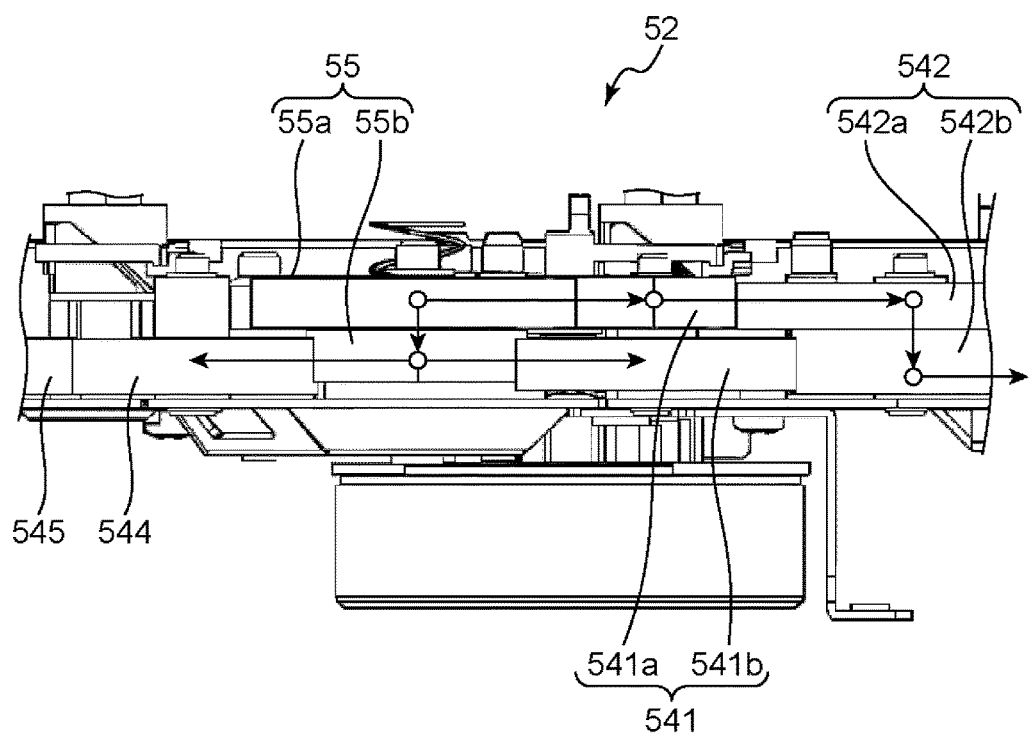
FIG. 9 illustrates a gear train of a developing transmission system in the first drive transmission system of the drive transmission device according to the one embodiment from above.

FIG. 9 illustrates the gear train of the developing transmission system 52 in the first drive transmission system 50 of the drive transmission device 5 from above. The developing transmission system 52 is configured to transmit the first driving power from the development driving power receiver gear 54 to each of the first developing roller 231Bk, the second developing roller 231Y, the third developing roller 231C, and the fourth developing roller 231M. Further, the developing transmission system 52 is configured to switch the transmission state of the first driving power from the development driving power receiver gear 54 to the first transmission state where the first driving power is transmitted to each of the first developing roller 231Bk, the second developing roller 231Y, the third developing roller 231C, and the fourth developing roller 231M, and the second transmission state where the first driving power is transmitted to the first developing roller 231Bk alone by the first driving power from the development driving power receiver gear 54. The developing transmission system 52 sets the transmission state of the first driving power to the first transmission state when the image to be formed is a color image, and sets the transmission state of the first driving power to the second transmission state when the image to be formed is a monochrome image.

The developing transmission system 52 includes a developing drive transmission relay gear 55 (drive transmission relay member), a first development drive transmission gear 541, a second development drive transmission gear 542, a third development drive transmission gear 543, a fourth development drive transmission gear 544, a fifth development drive transmission gear 545 and a sixth development drive transmission gear 546, a first development gear 521Bk, a second development gear 521Y, a third development gear 521C and a fourth development gear 521M.

As illustrated in FIG. 9, the developing drive transmission relay gear 55 includes a first gear unit 55a and a second gear unit 55b arranged coaxially. In the developing drive transmission relay gear 55, the first gear unit 55a is directly meshed with the development driving power receiver gear 54. Further, in the developing drive transmission relay gear 55, the second gear unit 55b is configured to be axially connected to or separated from the first gear unit 55a by the first driving power from the development driving power receiver gear 54. The developing drive transmission relay gear 55 serves as a relay point of the drive transmission in the developing transmission system 52 for transmitting the first driving power, which is directly transmitted to the developing drive transmission relay gear 55 from the development driving power receiver gear 54 via the first gear unit 55a, to the first development drive transmission gear 541, the second development drive transmission gear 542, the third development drive transmission gear 543, the fourth development drive transmission gear 544, the fifth development drive transmission gear 545, and the sixth development drive transmission gear 546 via the first gear unit 55a and the second gear unit 55b.

The developing drive transmission relay gear 55 is configured to transmit the first driving power directly transmitted from the development driving power receiver gear 54 via the first gear unit 55a to each of the first developing roller 231Bk, the second developing roller 231Y, the third developing roller 231C, and the fourth developing roller 231M. The developing drive transmission relay gear 55 is in the first transmission state that transmits the first driving power to each of the developing rollers 231Bk, 231Y, 231C, and 231M in a state where the second gear unit 55b is connected to the first gear unit 55a. The developing drive transmission relay gear 55 is in the second transmission state that transmits the first driving power to the first developing roller 231Bk alone in a state where the second gear unit 55b is separated with respect to the first gear unit 55a.

As illustrated in FIG. 9, the first development drive transmission gear 541 includes a first gear unit 541a and a second gear unit 541b arranged coaxially. In the first development drive transmission gear 541, the first gear unit 541a is meshed with the first gear unit 55a of the developing drive transmission relay gear 55, and the second gear unit 541b is meshed with the second gear unit 55b of the developing drive transmission relay gear 55.

As illustrated in FIG. 9, the second development drive transmission gear 542 includes a first gear unit 542a and a second gear unit 542b arranged coaxially. In the second development drive transmission gear 542, the first gear unit 542a is meshed with the first gear unit 541a of the first development drive transmission gear 541.

The third development drive transmission gear 543 is meshed with the second gear unit 542b of the second development drive transmission gear 542. The third development drive transmission gear 543 is meshed with the first development gear 521Bk arranged coaxially with the roller rotation shaft of the first developing roller 231Bk. The first gear unit 541a of the first development drive transmission gear 541, the first gear unit 542a and the second gear unit 542b of the second development drive transmission gear 542, the third development drive transmission gear 543, and the first development gear 521Bk constitute a drive transmission route (hereinafter referred to as "first development drive transmission route") that transmits the first driving power from the development driving power receiver gear 54 via the first gear unit 55a of the developing drive transmission relay gear 55, which is directly meshed with the development driving power receiver gear 54, to the first developing roller 231Bk.

The fourth development drive transmission gear 544 is meshed with the second gear unit 55b of the developing drive transmission relay gear 55. The fourth development drive transmission gear 544 is meshed with the fifth development drive transmission gear 545, and the fifth development drive transmission gear 545 is meshed with the sixth development drive transmission gear 546. The sixth development drive transmission gear 546 is meshed with the second development gear 521Y arranged coaxially with the roller rotation shaft of the second developing roller 231Y. The fourth development drive transmission gear 544, the fifth development drive transmission gear 545, the sixth development drive transmission gear 546, and the second development gear 521Y constitute a drive transmission route (hereinafter referred to as "second development drive transmission route") that transmits the first driving power from the development driving power receiver gear 54 via the second gear unit 55b of the developing drive transmission relay gear 55 to the second developing roller 231Y. In a state where the second gear unit 55b of the developing drive transmission relay gear 55 is connected to the first gear unit 55a, the first driving power is transmitted to the second development drive transmission route (first transmission state), and in a state where the second gear unit 55b is separated from the first gear unit 55a, the first driving power is not transmitted to the second development drive transmission route (second transmission state), by the first driving power from the development driving power receiver gear 54.

The fourth development drive transmission gear 544 is meshed with the third development gear 521C arranged coaxially with the roller rotation shaft of the third developing roller 231C. The fourth development drive transmission gear 544 and the third development gear 521C constitute a drive transmission route (hereinafter referred to as "third development drive transmission route") that transmits the first driving power from the development driving power receiver gear 54 via the second gear unit 55b of the developing drive transmission relay gear 55 to the third developing roller 231C. In a state where the second gear unit 55b of the developing drive transmission relay gear 55 is connected to the first gear unit 55a, the first driving power is transmitted to the third development drive transmission route (first transmission state), and in a state where the second gear unit 55b is separated from the first gear unit 55a, the first driving power is not transmitted to the third development drive transmission route (second transmission state), by the first driving power from the development driving power receiver gear 54.

The second gear unit 541b of the first development drive transmission gear 541 is meshed with the fourth development gear 521M arranged coaxially with the roller rotation shaft of the fourth developing roller 231M. The second gear unit 541b of the first development drive transmission gear 541 and the fourth development gear 521M constitute a drive transmission route (hereinafter referred to as "fourth development drive transmission route") that transmits the first driving power from the development driving power receiver gear 54 via the second gear unit 55b of the developing drive transmission relay gear 55 to the fourth developing roller 231M. In a state where the second gear unit 55b of the developing drive transmission relay gear 55 is connected to the first gear unit 55a, the first driving power is transmitted to the fourth development drive transmission route (first transmission state), and in a state where the second gear unit 55b is separated from the first gear unit 55a, the first driving power is not transmitted to the fourth development drive transmission route (second transmission state), by the first driving power from the development driving power receiver gear 54.

The above-described developing transmission system 52 is configured to switch the transmission state of the first driving power from the development driving power receiver gear 54. When the image to be formed is a color image, the developing transmission system 52 comes into the first transmission state where the first driving power is transmitted to each of the first developing roller 231Bk, the second developing roller 231Y, the third developing roller 231C, and the fourth developing roller 231M respectively via the first development drive transmission route, the second development drive transmission route, the third development drive transmission route, and the fourth development drive transmission route. When the image to be formed is a monochrome image, the developing transmission system 52 comes into the second transmission state where the first driving power is transmitted to the first developing roller 231Bk alone via the first development drive transmission route.

Specifically, when the image to be formed is a color image, the second gear unit 55b of the developing drive transmission relay gear 55 is set in a state connected to the first gear unit 55a. This causes the developing transmission system 52 to be in the first transmission state where the first driving power is transmitted to each of the first developing roller 231Bk, the second developing roller 231Y, the third developing roller 231C, and the fourth developing roller 231M. When the image to be formed is a monochrome image, the second gear unit 55b of the developing drive transmission relay gear 55 is set in a state separated from the first gear unit 55a. This causes the developing transmission system 52 to be in the second transmission state where the first driving power is transmitted to the first developing roller 231Bk alone.

According to the above-described drive transmission device 5, the drum driving power receiver gear 53 and the development driving power receiver gear 54 directly receive the first driving power from the first motor output shaft M1S of the first drive motor M1. The first driving power received by the drum driving power receiver gear 53 is transmitted to each of the first photoreceptor drum 21Bk, the second photoreceptor drum 21Y, the third photoreceptor drum 21C, and the fourth photoreceptor drum 21M respectively via the first drum drive transmission route, the second drum drive transmission route, the third drum drive transmission route, and the fourth drum drive transmission route by the drum transmission system 51. The first driving power received by the development driving power receiver gear 54 is used for the switching operation of the transmission state of the first driving power to each of the first developing roller 231Bk, the second developing roller 231Y, the third developing roller 231C, and the fourth developing roller 231M in the developing transmission system 52. Therefore, the first driving power generated by one first drive motor M1 can not only drive each of the first photoreceptor drum 21Bk, the second photoreceptor drum 21Y, the third photoreceptor drum 21C, and the fourth photoreceptor drum 21M, but also switch the transmission state of the first driving power to each of the first developing roller 231Bk, the second developing roller 231Y, the third developing roller 231C, and the fourth developing roller 231M.

In the above-described drive transmission device 5, the first motor output shaft M1S of the first drive motor M1 is directly meshed with the drum driving power receiver gear 53 and the development driving power receiver gear 54. Then, the drum transmission system 51 transmits the first driving power from the drum driving power receiver gear 53 to each of the first photoreceptor drum 21Bk, the second photoreceptor drum 21Y, the third photoreceptor drum 21C, and the fourth photoreceptor drum 21M. The developing transmission system 52 is configured to switch the transmission state of the driving power by the first driving power from the development driving power receiver gear 54. That is, the drum transmission system 51 and the developing transmission system 52 are branched via the drum driving power receiver gear 53 and the development driving power receiver gear 54 directly meshed with the first motor output shaft M1S of the first drive motor M1. This configuration ensures the drum transmission system 51 and the developing transmission system 52, which are in the identical layer of the branch hierarchy, to transmit the first driving power of the first drive motor M1 to each of the photoreceptor drums 21Bk, 21Y, 21C, and 21M, and each of the developing rollers 231Bk, 231Y, 231C, and 231M. Accordingly, the rotation speed control of the first drive motor M1 can be easily used for the accurate rotation control of the respective photoreceptor drums 21Bk, 21Y, 21C, and 21M, and the respective developing rollers 231Bk, 231Y, 231C, and 231M.

Figure 10A:
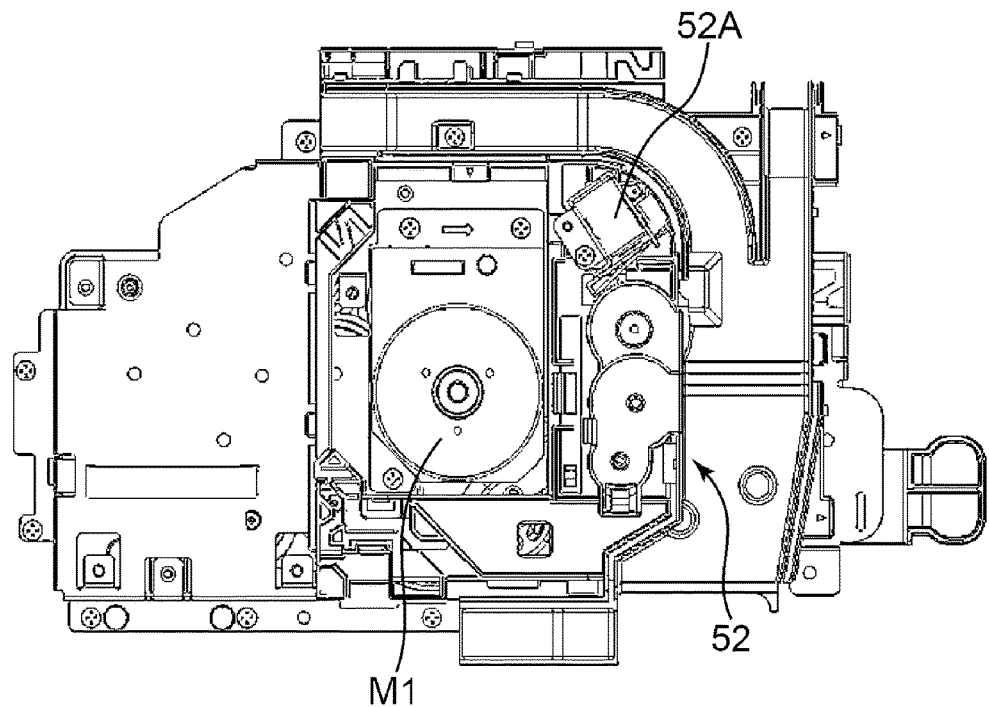
FIGS. 10A and 10B illustrate a configuration of the developing transmission system in the first drive transmission system of the drive transmission device according to the one embodiment in a plan view.
Figure 10B:
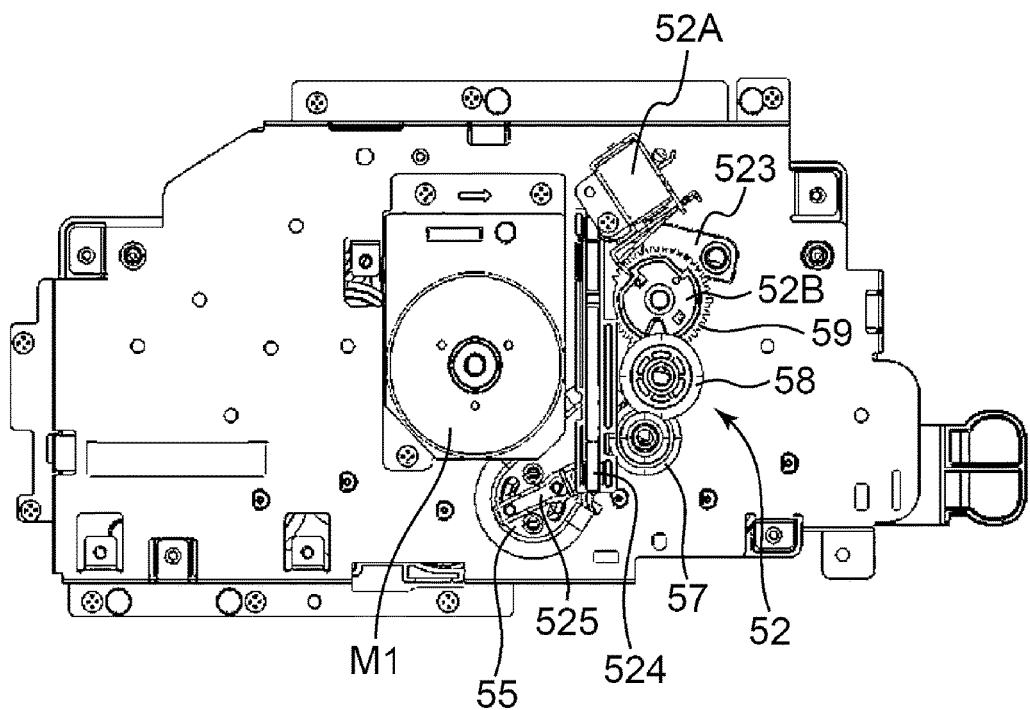
Figure 11A:
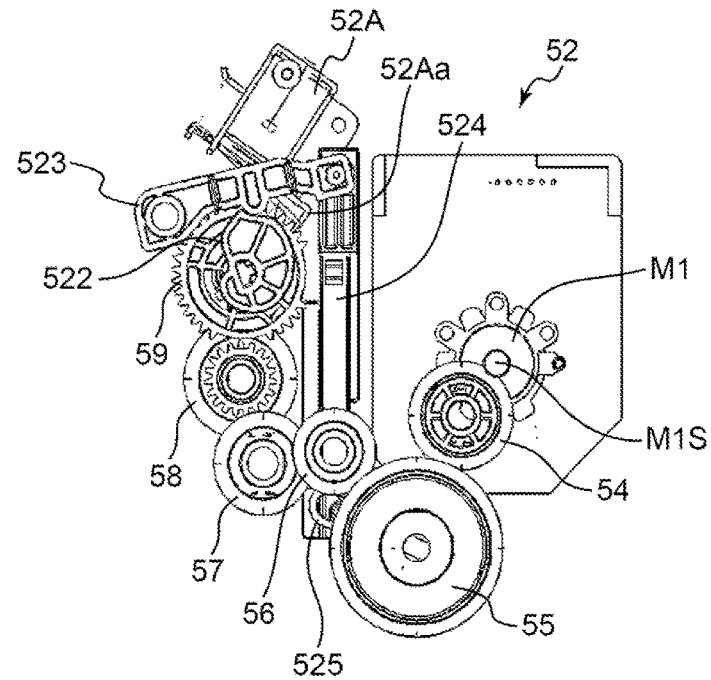
FIGS. 11A and 11B illustrate the configuration of the developing transmission system in the first drive transmission system of the drive transmission device according to the one embodiment in a plan view.
Figure 11B:
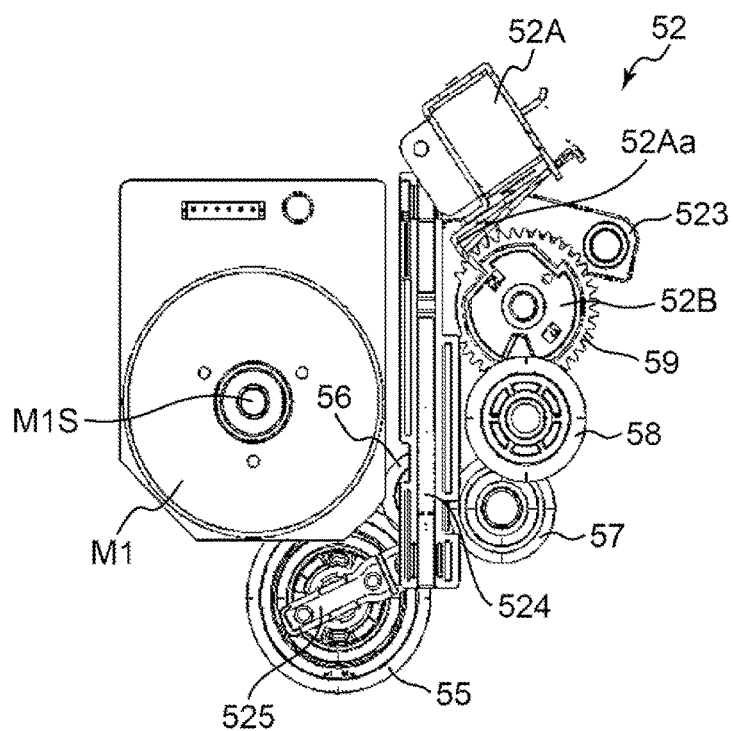
Figure 12A:
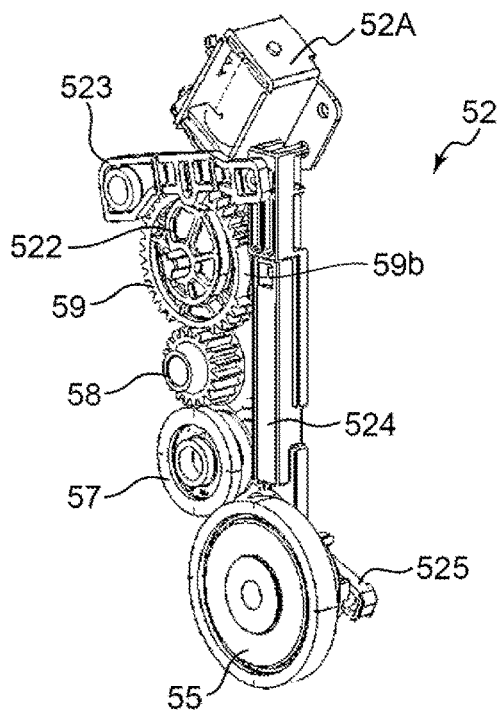
FIGS. 12A to 12C obliquely illustrate the configuration of the developing transmission system in the first drive transmission system of the drive transmission device according to the one embodiment.
Figure 12B:
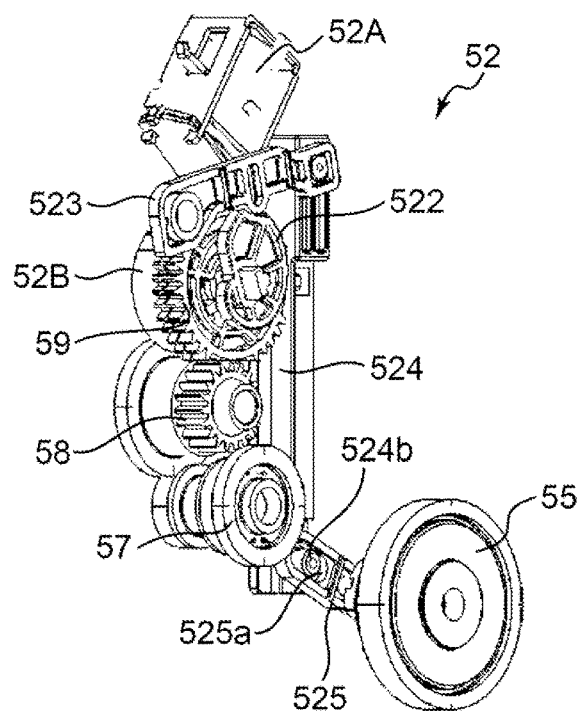
Figure 12C:
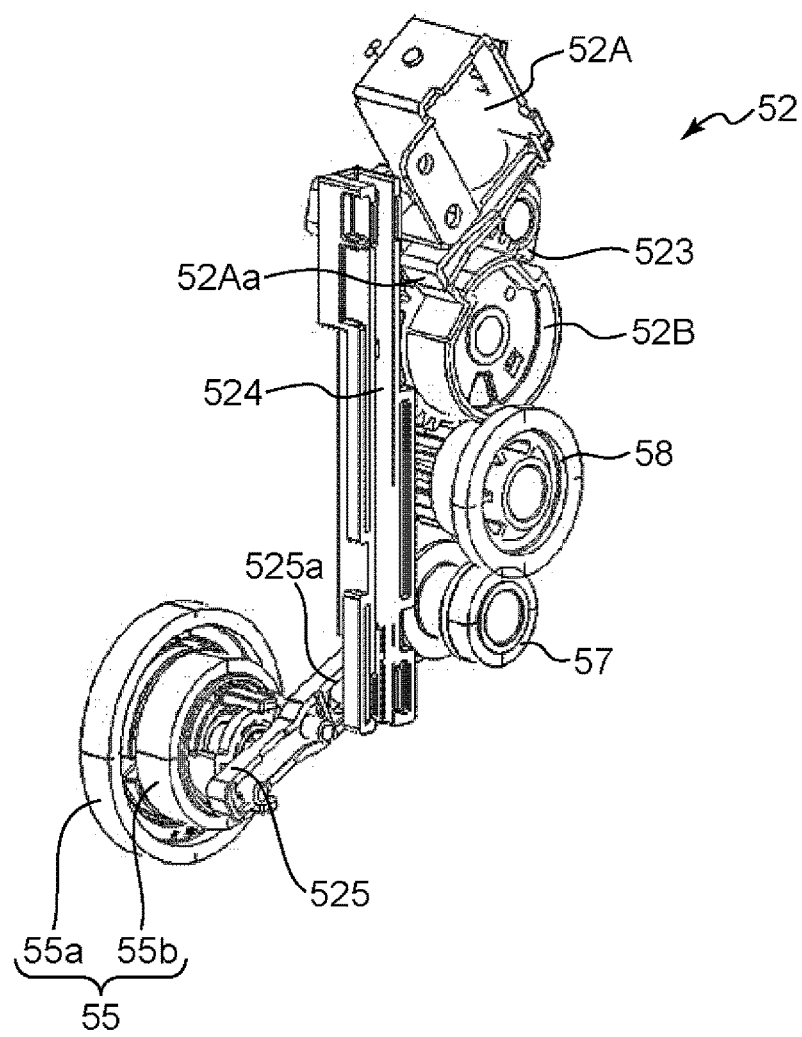

Next, a description will be given of the configuration of the developing transmission system 52 in the first drive transmission system 50 of the drive transmission device 5 according to the embodiment in more detail with reference to FIGS. 10A and 10B to FIGS. 16A and 16B. FIGS. 10A and 10B illustrate the configuration of the developing transmission system 52 in the first drive transmission system 50 of the drive transmission device 5 in a plan view. FIG. 10A illustrates a state where the cover is mounted, and FIG. 10B illustrates a state where the cover is removed. FIGS. 11A and 11B illustrate the configuration of the developing transmission system 52 in the first drive transmission system 50 of the drive transmission device 5 in a plan view. FIG. 11A illustrates the configuration viewed from the inner side, and FIG. 11B illustrates the configuration viewed from the outer side. FIGS. 12A, 12B, and 12C obliquely illustrate the configuration of the developing transmission system 52 in the first drive transmission system 50 of the drive transmission device 5.

The developing transmission system 52 includes the solenoid actuator 52A, the mechanical clutch 52B, a cam 522, a cam lever 523, a link member 524, a turning lever 525, a first drive transmission path switching gear 56, a second drive transmission path switching gear 57, a third drive transmission path switching gear 58, and a fourth drive transmission path switching gear 59, in addition to the developing drive transmission relay gear 55, the first development drive transmission gear 541, the second development drive transmission gear 542, the third development drive transmission gear 543, the fourth development drive transmission gear 544, the fifth development drive transmission gear 545, the sixth development drive transmission gear 546, the first development gear 521Bk, the second development gear 521Y, the third development gear 521C, and the fourth development gear 521M described above. The first drive transmission path switching gear 56, the second drive transmission path switching gear 57, the third drive transmission path switching gear 58, and the fourth drive transmission path switching gear 59 constitute a gear train arranged in this order from the lower side to the upper side in the vertical direction.

The first drive transmission path switching gear 56 is meshed with the first gear unit 55a of the developing drive transmission relay gear 55. The first drive transmission path switching gear 56 is meshed with the second drive transmission path switching gear 57, the second drive transmission path switching gear 57 is meshed with the third drive transmission path switching gear 58, and the third drive transmission path switching gear 58 is meshed with the fourth drive transmission path switching gear 59.

The mechanical clutch 52B is arranged coaxially with the fourth drive transmission path switching gear 59. The mechanical clutch 52B is a clutch for mechanically switching the transmission state of the first driving power to the first developing roller 231Bk, the second developing roller 231Y, the third developing roller 231C, and the fourth developing roller 231M in the developing drive transmission relay gear 55 to the first transmission state or the second transmission state. In this embodiment, the first drive transmission path switching gear 56, the second drive transmission path switching gear 57, the third drive transmission path switching gear 58, and the fourth drive transmission path switching gear 59 constitute a drive transmission route (hereinafter referred to as "development drive transmission switching path") that transmits the first driving power from the development driving power receiver gear 54 via the first gear unit 55a of the developing drive transmission relay gear 55 as the driving power to execute the switching operation of the transmission state in the mechanical clutch 52B to the mechanical clutch 52B.

The mechanical clutch 52B executes the switching operation of the transmission state of the first driving power in the developing drive transmission relay gear 55 by the first driving power from the development driving power receiver gear 54 transmitted via the development drive transmission switching path. This configuration ensures downsizing of the drive transmission device regardless of the action of the high torque caused by the property of the mechanical clutch 52B that can transmit the high torque and is compact and lightweight.

The solenoid actuator 52A is arranged above the mechanical clutch 52B arranged coaxially with the fourth drive transmission path switching gear 59. The solenoid actuator 52A is a converter that converts electric energy to mechanical energy, and has a function where a fixed iron core is energized by a coil (solenoid) and a stop portion 52Aa as a movable iron core operates in the magnetic field.

Energizing the fixed iron core by the coil causes the stop portion 52Aa as the movable iron core to retreat upward to release a mechanical lock with the mechanical clutch 52B of the solenoid actuator 52A. Stopping energizing the fixed iron core by the coil causes the stop portion 52Aa as the movable iron core to move downward with a spring or its own weight to mechanically lock with the mechanical clutch 52B of the solenoid actuator 52A.

Specifically, a first engaging portion 52Ba and a second engaging portion 52Bb having stepped shapes in the circumferential direction are formed to each engage with the stop portion 52Aa of the solenoid actuator 52A along an outer peripheral surface of the mechanical clutch 52B. In a state where the fixed iron core is not energized, the stop portion 52Aa engages with the first engaging portion 52Ba and the second engaging portion 52Bb to regulate a rotation of the mechanical clutch 52B in a drive transmission direction.

On the other hand, on an outer periphery of the fourth drive transmission path switching gear 59, a first toothless portion 59a and a second toothless portion 59b, which are regions where the gear is not formed, are formed. The first toothless portion 59a is located opposed to an engaging position with the third drive transmission path switching gear 58 in a state where the stop portion 52Aa is engaged with the first engaging portion 52Ba. Therefore, even if the third drive transmission path switching gear 58 is rotatably driven, the driving power is not transmitted to the fourth drive transmission path switching gear 59 and the fourth drive transmission path switching gear 59 is in a state where the rotation is stopped.

The second toothless portion 59b is located opposed to the engaging position with the third drive transmission path switching gear 58 in a state where the stop portion 52Aa is engaged with the second engaging portion 52Bb. Therefore, even if the third drive transmission path switching gear 58 is rotatably driven, the driving power is not transmitted to the fourth drive transmission path switching gear 59 and the fourth drive transmission path switching gear 59 is in a state where the rotation is stopped. In a state where the fourth drive transmission path switching gear 59 is in a stopped state due to the engagement of the stop portion 52Aa and the first engaging portion 52Ba or the second engaging portion 52Bb, the fourth drive transmission path switching gear 59 is subjected to an effect of a biasing force to rotate in the drive transmission direction by a force acting on the cam 522 from the cam lever 523, which will be described in detail later.

Here, energizing the fixed iron core for an instant of time by the coil, the engagement of the stop portion 52Aa and the first engaging portion 52Ba or the second engaging portion 52Bb is released during the instant of time to cause the fourth drive transmission path switching gear 59 to be in a state of rotatable. Then, the fourth drive transmission path switching gear 59 is rotated in the drive transmission direction by the force from the cam lever 523 that acts on the cam 522 to move the first toothless portion 59a or the second toothless portion 59b. Then, a gear portion of the fourth drive transmission path switching gear 59 is engaged with the third drive transmission path switching gear 58 to transmit the driving power to further rotate the fourth drive transmission path switching gear 59.

However, a period of time to energize the fixed iron core by the coil is shorter than the rotation of the fourth drive transmission path switching gear 59 until the next engaging portion passes through the stop portion 52Aa. When the energization of the fixed iron core is released, the stop portion 52Aa moves downward to be in abutting contact with the outer peripheral surface of the mechanical clutch 52B and swing to engage with the next engaging portion. Accordingly, every time the fixed iron core is energized for a predetermined period of time, the stop portion 52Aa alternately engages with the first engaging portion 52Ba and the second engaging portion 52Bb and stops. As a description will be given later, a state where the stop portion 52Aa engages with the first engaging portion 52Ba is the first transmission state and a state where the stop portion 52Aa engages with the second engaging portion 52Bb is the second transmission state.

When the image forming apparatus 1 is powered, various parameters are initialized and an initial setting such as a temperature setting of the fixing unit 4 is executed. At a predetermined timing corresponding to a progress of the initial setting, the first drive motor M1 and the second drive motor M2 are rotatably driven. While the first drive motor M1 and the second drive motor M2 are rotatably driven during the initial setting, the fixed iron core is energized once by the coil. The period of time that the fixed iron core is energized by the coil then is set to be longer than a period of time that the fourth drive transmission path switching gear 59 rotates from the first engaging portion 52Ba to the second engaging portion 52Bb and shorter than a period of time that the fourth drive transmission path switching gear 59 rotates from the second engaging portion 52Bb to the first engaging portion 52Ba. Accordingly, no matter which of the first engaging portion 52Ba and the second engaging portion 52Bb the stop portion 52Aa engages with before the image forming apparatus 1 is powered, the stop portion 52Aa becomes a state of engaging with the first engaging portion 52Ba (the first transmission state) in the initial setting.

When the stop portion 52Aa of the solenoid actuator 52A performs a mechanical lock and releases the lock, the mechanical clutch 52B executes the switching operation of the transmission state of the first driving power in the developing drive transmission relay gear 55. This configuration ensures the mechanical clutch 52B to execute the switching operation of the transmission state of the first driving power in the developing drive transmission relay gear 55 when the solenoid actuator 52A performs the mechanical lock and releases the lock without a sensor that detects a signal to execute the switching operation of the transmission state of the first driving power.

In this embodiment, the cam 522 is arranged coaxially with the fourth drive transmission path switching gear 59 opposing to the mechanical clutch 52B via the fourth drive transmission path switching gear 59. The cam 522 includes an outer peripheral surface with a curved surface that has a not constant distance from the rotation shaft. The outer peripheral surface of the cam 522 includes a first outer periphery portion 522a where a cam contact portion 523b of the cam lever 523 described below is in contact with when the transmission state of the first driving power in the developing drive transmission relay gear 55 switched by the mechanical clutch 52B is the first transmission state, and a second outer periphery portion 522b where the cam contact portion 523b is in contact with when the transmission state of the first driving power is the second transmission state.

Figure 13A:
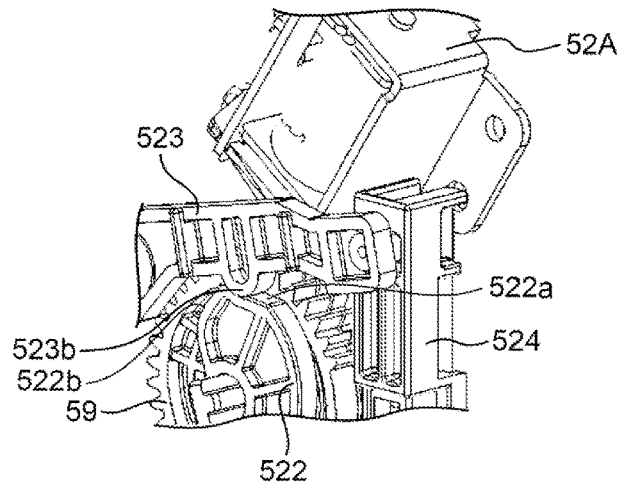
FIGS. 13A to 13C obliquely illustrate an enlarged proximity of a cam lever in the developing transmission system according to the one embodiment.
Figure 13B:
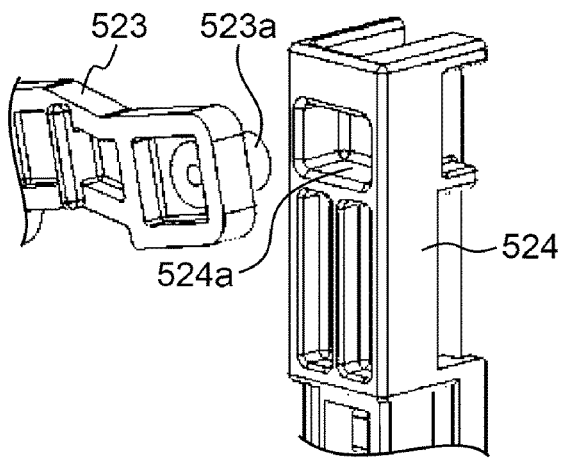
Figure 13C:
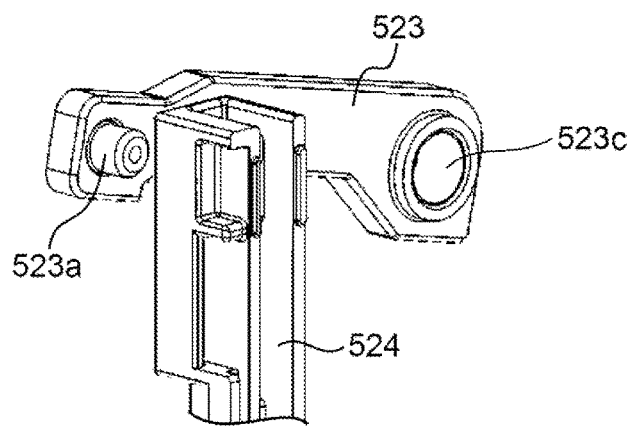

The cam lever 523 is formed in a long plate shape extending in an approximately front-rear direction, and arranged above the cam 522 arranged coaxially with the fourth drive transmission path switching gear 59. The link member 524 is formed in a long bar shape extending in the vertical direction along the gear train of the first drive transmission path switching gear 56, the second drive transmission path switching gear 57, the third drive transmission path switching gear 58, and the fourth drive transmission path switching gear 59. FIGS. 13A, 13B, and 13C obliquely illustrate an enlarged proximity of the cam lever 523 in the developing transmission system 52. FIG. 13A illustrates a relation between the cam lever 523 and the cam 522, and FIGS. 13B and 13C illustrate relations between the cam lever 523 and the link member 524.

The cam lever 523 includes a fulcrum 523a located on one end portion in the longitudinal direction, the cam contact portion 523b located on a middle portion in the longitudinal direction projecting to the lower side toward the cam 522, and a shaft support portion 523c. The link member 524 includes a journal portion 524a located on one end portion of the upper side in the longitudinal direction passing through in the thickness direction, and a fulcrum 524b located protruding on one end portion of the lower side in the longitudinal direction. The cam lever 523 is connected to the link member 524 in a state where the fulcrum 523a is inserted through the journal portion 524a of the link member 524. The link member 524 is biased downward by a spring member (not illustrated).

In the cam lever 523, when the transmission state of the first driving power in the developing drive transmission relay gear 55 switched by the mechanical clutch 52B is the first transmission state, that is, the stop portion 52Aa is in a state of being engaged with the first engaging portion 52Ba, the cam contact portion 523b is in contact with the first outer periphery portion on the outer peripheral surface of the cam 522. Then, the cam lever 523 turns with the shaft support portion 523c as the center such that the fulcrum 523a comes to the upper side with respect to the cam contact portion 523b in the vertical direction. Corresponding to the turning operation of the cam lever 523, the link member 524 connected to the fulcrum 523a of the cam lever 523 on the journal portion 524a linearly moves to the upper side in the vertical direction.

In the cam lever 523, when the transmission state of the first driving power in the developing drive transmission relay gear 55 switched by the mechanical clutch 52B is the second transmission state, that is, the stop portion 52Aa is in a state of being engaged with the second engaging portion 52Bb, the cam contact portion 523b is in contact with the second outer periphery portion on the outer peripheral surface of the cam 522. Then, the cam lever 523 turns with the shaft support portion 523c as the center such that the fulcrum 523a comes to the lower side with respect to the cam contact portion 523b in the vertical direction. Corresponding to the turning operation of the cam lever 523, the link member 524 connected to the fulcrum 523a of the cam lever 523 on the journal portion 524a linearly moves to the lower side in the vertical direction by a biasing force of the spring member.

Figure 14A:
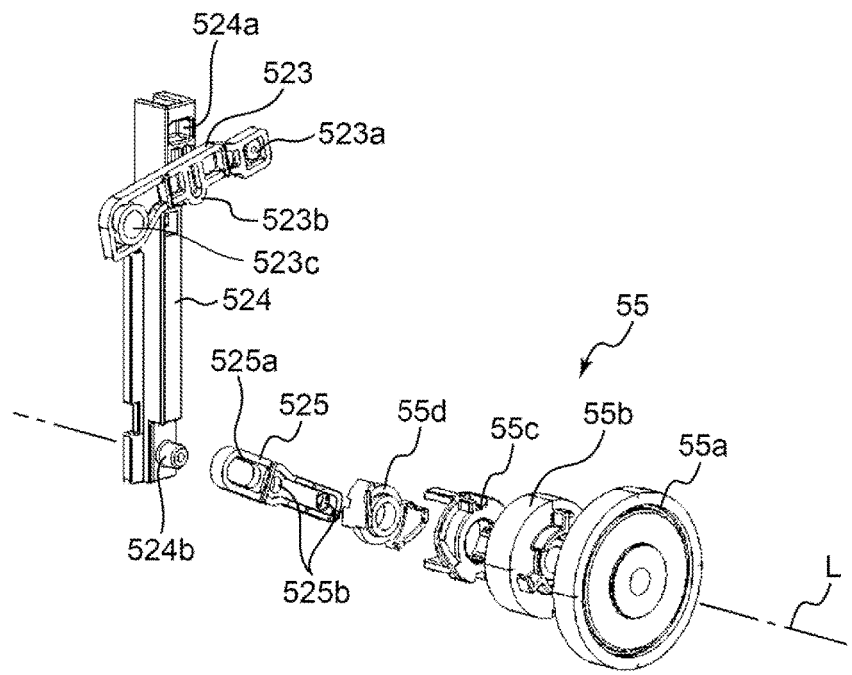
FIGS. 14A and 14B obliquely illustrate the configuration of exploded turning lever and developing drive transmission relay gear in the developing transmission system according to the one embodiment.
Figure 14B:
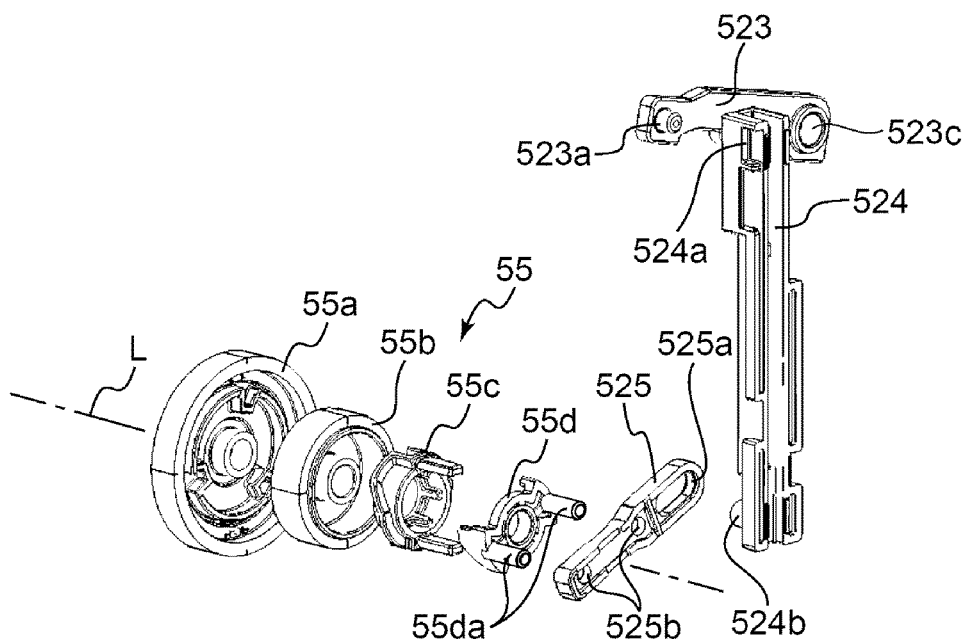

To the fulcrum 524b of the link member 524, the turning lever 525 is connected. FIGS. 14A and 14B obliquely illustrate the configuration of the exploded turning lever 525 and developing drive transmission relay gear 55 in the developing transmission system 52.

The turning lever 525 is formed in a long plate shape extending in the approximately front-rear direction, and includes an elongated hole shaped journal portion 525a located on one end portion in the longitudinal direction passing through in the thickness direction, and a pair of insertion holes 525b located on the middle portion in the longitudinal direction and the other end portion in the longitudinal direction passing through in the thickness direction. The turning lever 525 is connected to the link member 524 in a state where the fulcrum 524b of the link member 524 is inserted through the journal portion 525a.

The turning lever 525 turns with the fulcrum 524b of the link member 524 inserted through the journal portion 525a as the center corresponding to the linear moving operation of the link member 524 in the vertical direction. The turning lever 525 turns such that the insertion hole 525b located on the other end portion in the longitudinal direction comes to the lower side with respect to the journal portion 525a in the vertical direction corresponding to the linear movement of the link member 524 to the upper side in the vertical direction when the transmission state of the first driving power in the developing drive transmission relay gear 55 switched by the mechanical clutch 52B is the first transmission state. The turning lever 525 turns such that the insertion hole 525b located on the other end portion in the longitudinal direction comes to the upper side with respect to the journal portion 525a in the vertical direction corresponding to the linear movement of the link member 524 to the lower side in the vertical direction when the transmission state of the first driving power in the developing drive transmission relay gear 55 switched by the mechanical clutch 52B is the second transmission state.

Figure 15A:
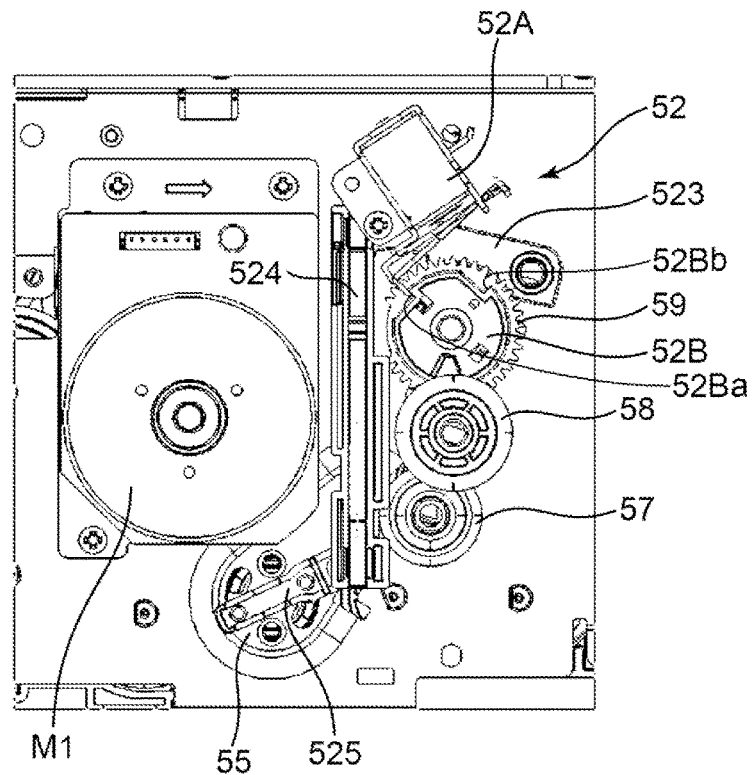
FIGS. 15A and 15B illustrate a drive transmission state of the developing transmission system in color image forming according to the one embodiment.
Figure 15B:
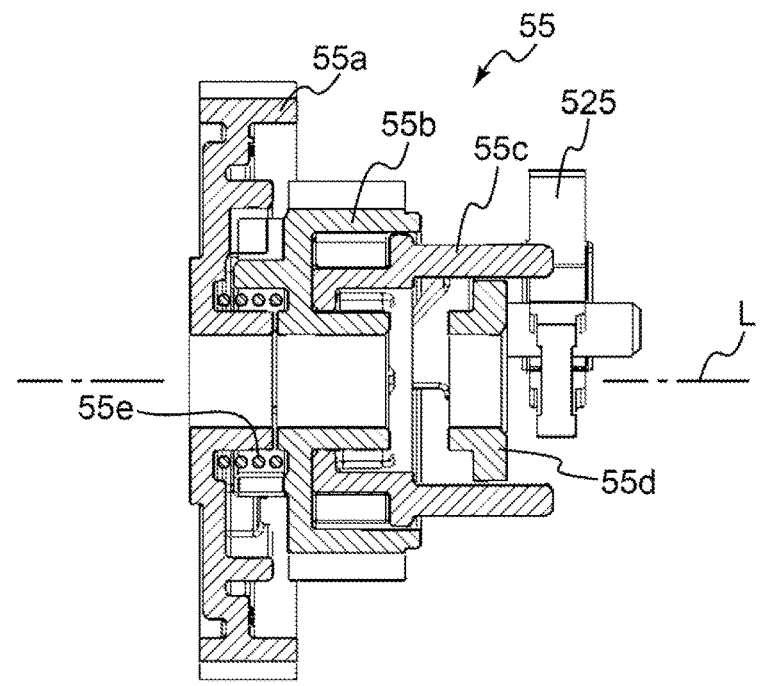
Figure 16A:
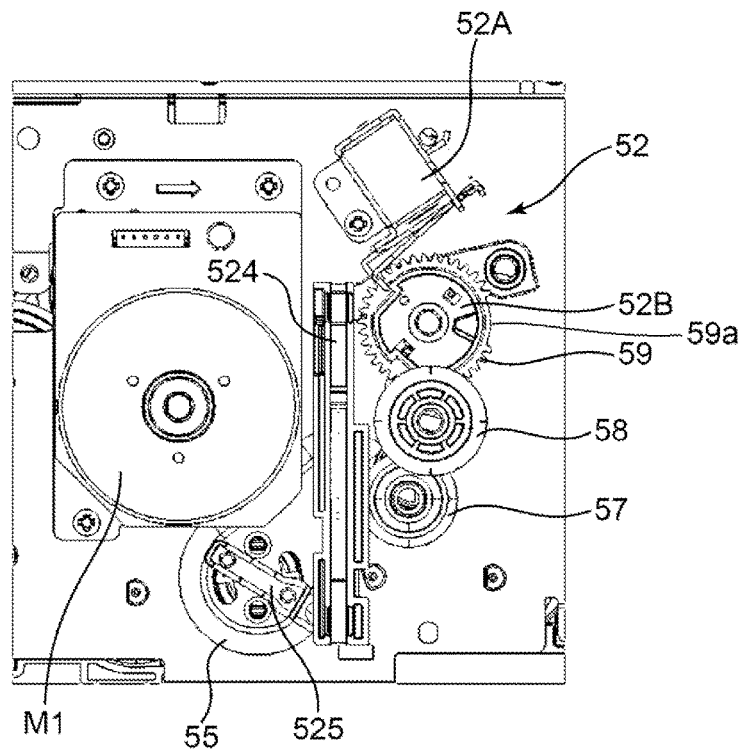
FIGS. 16A and 16B illustrate a drive transmission state of the developing transmission system in monochrome image forming according to the one embodiment.
Figure 16B:
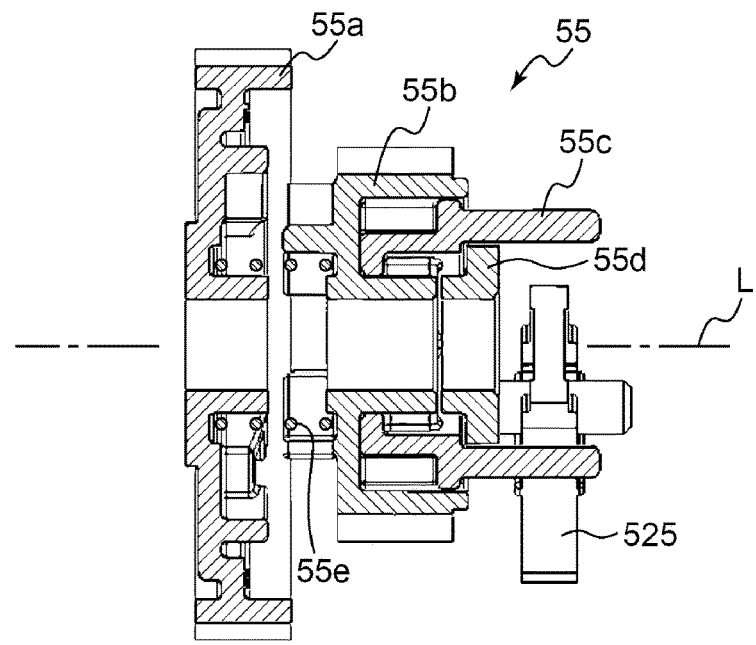

To the pair of the insertion holes 525b of the turning lever 525, the developing drive transmission relay gear 55 is connected. The configuration of the developing drive transmission relay gear 55 of the embodiment will be described with reference to FIGS. 14A and 14B, FIGS. 15A and 15B, and FIGS. 16A and 16B. FIGS. 15A and 15B illustrate the drive transmission state of the developing transmission system 52 in a color image forming. FIG. 15A illustrates the developing transmission system 52 in a plan view, and FIG. 15B illustrates a cross section of the developing drive transmission relay gear 55. FIGS. 16A and 16B illustrate the drive transmission state of the developing transmission system 52 in a monochrome image forming. FIG. 16A illustrates the developing transmission system 52 in a plan view, and FIG. 16B illustrates a cross section of the developing drive transmission relay gear 55.

In this embodiment, as illustrated in FIGS. 14A and 14B, the developing drive transmission relay gear 55 includes a pressure action unit 55c and a connection state switching unit 55d arranged coaxially with a rotation shaft L in addition to the above-described first gear unit 55a and second gear unit 55b. Between the first gear unit 55a and the second gear unit 55b, a coil spring 55e is located. The first gear unit 55a and the second gear unit 55b are biased by the coil spring 55e in the direction of the rotation shaft L in a direction separating from one another. The biasing force of the coil spring 55e is set to be weaker than the biasing force of the link member 524.

As described above, in the developing drive transmission relay gear 55, the first gear unit 55a is directly meshed with the development driving power receiver gear 54. Further, in the developing drive transmission relay gear 55, the second gear unit 55b is configured to connect to and separate from the first gear unit 55a in the axial direction of the rotation shaft L. In this embodiment, the developing drive transmission relay gear 55 is connected to the turning lever 525 in a state where each of a pair of protrusion portions 55da of the connection state switching unit 55d are inserted through the insertion holes 525b of the turning lever 525.

In the developing drive transmission relay gear 55, the pressure action unit 55c is movably engaged with the connection state switching unit 55d in the axial direction of the rotation shaft L. The pressure action unit 55c moves in the axial direction of the rotation shaft L corresponding to the turning operation of the connection state switching unit 55d by the turning operation of the turning lever 525.

Specifically, when the image to be formed is a color image, as illustrated in FIGS. 15A and 15B, the pressure action unit 55c moves in a direction approaching to the first gear unit 55a corresponding to the turning operation where the insertion holes 525b, which are located on the other end portion of the turning lever 525 in the longitudinal direction, come to the lower side with respect to the journal portion 525a in the vertical direction. This move of the pressure action unit 55c in the direction approaching to the first gear unit 55a causes the second gear unit 55b to axially receive a pressing force to move in the direction approaching to the first gear unit 55a. This connects the second gear unit 55b to the first gear unit 55a. Thus, when the second gear unit 55b of the developing drive transmission relay gear 55 is connected to the first gear unit 55a, the developing transmission system 52 comes into the first transmission state that transmits the first driving power to each of the first developing roller 231Bk, the second developing roller 231Y, the third developing roller 231C, and the fourth developing roller 231M.

When the image to be formed is a monochrome image, as illustrated in FIGS. 16A and 16B, in the developing drive transmission relay gear 55, the pressure action unit 55c moves in the direction moving away from the first gear unit 55a corresponding to the turning movement where the insertion holes 525b, which are located on the other end portion of the turning lever 525 in the longitudinal direction, come to the upper side with respect to the journal portion 525a in the vertical direction. This move of the pressure action unit 55c in the direction moving away from the first gear unit 55a causes the second gear unit 55b to be moved in the direction moving away from the first gear unit 55a by the biasing force of the coil spring 55e. This separates the second gear unit 55b from the first gear unit 55a. Thus, when the second gear unit 55b of the developing drive transmission relay gear 55 is separated from the first gear unit 55a, the developing transmission system 52 comes into the second transmission state that transmits the first driving power to the first developing roller 231Bk alone.

According to the above-described drive transmission device 5, the mechanical clutch 52B, where the solenoid actuator 52A performs the mechanical lock and releases the lock, is configured to switch the transmission state of the first driving power in the developing drive transmission relay gear 55 to the first transmission state or the second transmission state by the first driving power received by the development driving power receiver gear 54. Therefore, the first driving power generated by one first drive motor M1 can not only drive each of the first photoreceptor drum 21Bk, the second photoreceptor drum 21Y, the third photoreceptor drum 21C, and the fourth photoreceptor drum 21M, but also switch the transmission state of the first driving power to each of the first developing roller 231Bk, the second developing roller 231Y, the third developing roller 231C, and the fourth developing roller 231M.

While the drive transmission device 5 according to the embodiment of the disclosure and the image forming apparatus 1 that includes the drive transmission device 5 have been described above, the disclosure is not limited to this. For example, the disclosure can employ the following modified embodiments.

(1) While the configuration of the drive transmission device 5 that includes image forming units of four colors of 2Bk, 2Y, 2C, and 2M has been described in the above embodiment, the disclosure is not limited to this. The drive transmission device 5 may have a configuration that includes at least two image forming units.

(2) While the configuration where the photoreceptor drums and the developing rollers are applied as rotators has been described in the above embodiment, the disclosure is not limited to this. Rotators other than the photoreceptor drum and the developing roller may be applied. For example, an aspect where the driving power is transmitted not to the developing roller but to a not illustrated screw member internally arranged on the developing device 23 may be employed.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

What is claimed is:

1. An image forming apparatus comprising:
   an imaging system that includes a first structure and a second structure, the first structure and the second structure including respective rotators, the imaging system forming an image on a sheet;
   a drive motor that generates driving power to drive the imaging system; and
   a drive transmission device for transmitting the driving power generated by the drive motor to the rotators, the drive transmission device comprising
   a rotator drive transmission system configured to switch a state of transmission of the drive-motor driving power into a first transmission state in which the driving power is transmitted to the respective rotators of the first structure and the second structure, and into a second transmission state in which the driving power is transmitted to the rotator of the first structure alone;
   the rotator drive transmission system having
      a switching gear provided with toothless portions in at least two locations on its outer periphery,
      a mechanical clutch provided with lock portions in at least two locations on its outer peripheral surface,
      a cam whose outer peripheral surface is at a non-constant separation from its rotational axis, and
      a solenoid actuator operating such as to mechanically lock on and release off the lock portions; wherein
      by the solenoid actuator carrying out mechanical locking on and releasing off the lock portions, an operation of switching the driving-power transmission state from the first transmission state to the second transmission state is mechanically executed.

2. The image forming apparatus according to claim 1, wherein the rotators are developing rollers for superficially supplying developer circumferentially onto an image carrier in the image forming apparatus.

3. The image forming apparatus according to claim 1, wherein the switching gear, the mechanical clutch, and a cam are coaxially disposed.

4. The image forming apparatus according to claim 1, further comprising a driving power receiver that output-shaft directly receives the drive-motor driving power; wherein
   the rotator drive transmission system is configured to switch the transmission state of the driving power from the driving power receiver between the first transmission state and the second transmission state by the driving power from the driving power receiver.

5. The image forming apparatus according to claim 1, wherein:
   the solenoid actuator has a stop portion abutting on the outer peripheral surface of the mechanical clutch;
   the mechanical clutch has an engaging portion in its outer peripheral surface; and
   under operation of the rotator drive transmission system, the stop portion momentarily separates from the outer peripheral surface of the mechanical clutch, and then again abuts on the outer peripheral surface and, sliding along the outer peripheral surface, engages with the engaging portion.

6. The image forming apparatus according to claim 1, wherein:
- the mechanical clutch is provided with a first engaging portion and a second engaging portion; and
- a state in which the solenoid actuator is engaged with the first engaging portion is the first transmission state, and a state in which the solenoid actuator is engaged with the second engaging portion is the second transmission state.

7. The image forming apparatus according to claim 6, wherein the rotational angle from the first engaging portion to the second engaging portion is an angle smaller than 180°.

* * * * *